(12) United States Patent
Ishizuka et al.

(10) Patent No.: US 8,203,247 B2
(45) Date of Patent: Jun. 19, 2012

(54) STATOR FOR ELECTRIC ROTATING MACHINE

(75) Inventors: Atsuo Ishizuka, Nagoya (JP); Atsushi Umeda, Okazaki (JP)

(73) Assignee: Denso Corporation, Kariya (JP)

( * ) Notice: Subject to any disclaimer, the term of this patent is extended or adjusted under 35 U.S.C. 154(b) by 288 days.

(21) Appl. No.: 12/638,114

(22) Filed: Dec. 15, 2009

(65) Prior Publication Data
US 2010/0148620 A1    Jun. 17, 2010

(30) Foreign Application Priority Data

Dec. 15, 2008 (JP) .................................. 2008-319002
Dec. 10, 2009 (JP) .................................. 2009-280800

(51) Int. Cl.
*H02K 3/04* (2006.01)
(52) U.S. Cl. ............................................. 310/201
(58) Field of Classification Search .............. 310/201, 310/207, 180, 205, 206, 208
See application file for complete search history.

(56) References Cited

U.S. PATENT DOCUMENTS

| 6,140,735 A | 10/2000 | Kato et al. |
| 6,930,426 B2 * | 8/2005 | Neet et al. .................. 310/208 |
| 2009/0260217 A1 * | 10/2009 | Kamakura et al. ............. 29/596 |

FOREIGN PATENT DOCUMENTS

| JP | 2000-139048 | 5/2000 |
| WO | WO 2008/108351 | 9/2008 |

* cited by examiner

*Primary Examiner* — Nguyen N Hanh
(74) *Attorney, Agent, or Firm* — Nixon & Vanderhye PC

(57) ABSTRACT

A stator for an electric rotating machine includes a hollow cylindrical stator core and a stator coil made up of a plurality of wave-shaped electric wires. Each of the electric wires has a plurality of in-slot portions, each of which is received in one of slots of the stator core, and a plurality of turn portions each of which is located outside of the slots of the stator core to connect one adjacent pair of the in-slot portions of the electric wire. The stator coil includes a plurality of radial position shift portions each of which is provided, in one of the electric wires, in one of the turn portions of the electric wire between an apex part of the turn portion and one of the in-slot portions of the electric wire adjoining the turn portion and is radially bent to shift the radial position of the electric wire.

10 Claims, 24 Drawing Sheets

STATOR FOR ELECTRIC ROTATING MACHINE

CROSS-REFERENCE TO RELATED APPLICATION

This application is based on and claims priority from Japanese Patent Applications No. 2008-319002, filed on Dec. 15, 2008, and No. 2009-280800, filed on Dec. 10, 2009, the contents of which are hereby incorporated by reference into this application.

BACKGROUND OF THE INVENTION

1. Technical Field of the Invention

The present invention relates to stators for electric rotating machines that are used in, for example, motor vehicles as electric motors and electric generators.

2. Description of the Related Art

In recent years, electric rotating machines, such as electric motors and electric generators, have been required to be compact, be able to output high power, and have high quality. In particular, for electric rotating machines for use in motor vehicles, the spaces available for installation of those machines in the motor vehicles have been decreasing, while the need for them to output high power has been increasing.

Generally, for making an electric rotating machine compact while enabling it to output high power, it is required to: reduce the resistances of rotor and stator coils of the machine; improve the space factors of electric wires, which form the stator coil, in slots of a stator core of the machine; and arrange regularly and densely those portions of the electric wires which protrude outside of the slots of the stator core.

To meet the above requirements, PCT International Publication No. WO 2008/108351 A1 and Japanese Patent First Publication No. 2000-139048, both of which have the same assignee as the present application, disclose techniques for improving stators for electric rotating machines. Those stators each include a hollow cylindrical stator core and a stator coil mounted on the stator core. The stator core has a plurality of slots that are formed in the radially inner surface of the stator core and spaced in the circumferential direction of the stator core at predetermined intervals. The stator coil is made up of a plurality of electric wires wave-wound around the stator core. Specifically, each of the electric wires includes a plurality of in-slot portions, which are received in the slots of the stator core, and a plurality of turn portions that are located outside of the slots to connect the in-slot portions.

According to one technique disclosed in PCT International Publication No. WO 2008/108351 A1, each of the turn portions of the electric wires is configured to include a plurality of shoulder parts that extend parallel to an axial end face of the stator core. With the shoulder parts, it is possible to densely arrange the turn portions of the electric wires and to reduce the protruding height of the turn portions from the axial end face of the stator core.

According to another technique disclosed in Japanese Patent First Publication No. 2000-139048, the stator coil is formed by (1) interlacing the electric wires in a predetermined manner to form a flat band-shaped electric wire assembly; and (2) rolling the flat band-shaped electric wire assembly by a predetermined number of turns to form a hollow cylindrical electric wire assembly which makes up the stator coil. With this technique, it is possible to reduce the radial width of the turn portions of the electric wires. In addition, the stator coil disclosed in PCT International Publication No. WO 2008/108351 A1 is also formed using the above technique.

However, with the above technique for forming the stator coil, when the number of the electric wires is large, the process of interlacing the electric wires may become very complicated, thus increasing the manufacturing cost of the stator coil.

Therefore, the inventors of the present invention have investigated a simpler method of forming the flat band-shaped electric wire assembly. As a result, they have concluded that the manufacturing cost of the stator coil may be reduced by forming the flat band-shaped electric wire assembly by simply stacking, instead of interlacing, the electric wires.

However, in this case, if the electric wires were not properly shaped, the thickness of the resultant flat band-shaped electric wire assembly would vary cyclically in the longitudinal direction of the assembly. Moreover, the variation in the thickness of the assembly would be greater than that in the case of forming the assembly by interlacing the electric wires. Consequently, in the stator coil that is obtained by rolling the flat band-shaped electric wire assembly into the hollow cylindrical shape, there would be formed protruding portions which protrude radially inward from the radially inner surface of the stator coil or radially outward from the radially outer surface of the stator coil. As a result, after assembling the stator coil to the stator core, as illustrated in FIG. 20, some of the in-slot portions of the electric wires would protrude radially inward from the corresponding slots of the stator core, forming void spaces at the bottoms of the corresponding slots. With the void spaces, the space factors of the electric wires in the corresponding slots would be decreased, thereby lowering the performance of the stator. Here, the space factor for each of the slots of the stator core is defined as the ratio of the sum of cross-sectional areas of those in-slot portions of the electric wires which are actually received in the slot to the cross-sectional area of the slot.

SUMMARY OF THE INVENTION

According to the present invention, there is provided a stator for an electric rotating machine which includes a hollow cylindrical stator core and a stator coil. The stator core has a plurality of slots that are formed in the radially inner surface of the stator core and spaced at predetermined intervals in the circumferential direction of the stator core. The stator coil is made up of a plurality of wave-shaped electric wires mounted on the stator core. Each of the electric wires has a plurality of in-slot portions, each of which is received in one of the slots of the stator core, and a plurality of turn portions each of which is located outside of the slots of the stator core to connect one adjacent pair of the in-slot portions of the electric wire. Each of the turn portions includes an apex part that is located axially furthest in the turn portion from the stator core. Further, the stator coil includes a plurality of radial position shift portions each of which is provided, in one of the electric wires, in one of the turn portions of the electric wire between the apex part of the turn portion and one of the in-slot portions of the electric wire adjoining the turn portion and is radially bent to shift the radial position of the electric wire.

With the radial position shift portions, it is possible to prevent interference between the turn portions of the electric wires, thereby preventing portions of the electric wires from protruding radially inward from the radially inner surface of the stator coil or protruding radially outward from the radially outer surface of the stator coil. In other words, it is possible to make both the radially inner and outer surfaces of the stator coil smooth and cylindrical. Consequently, the in-slot portions of the electric wires can be reliably received in the corresponding slots of the stator core without protruding radially inward from the corresponding slots and without forming void spaces at the bottoms of the corresponding slots. As a result, the space factors of the electric wires in the slots of the stator core can be maximized, thereby ensuring high performance of the stator.

In the stator according to the invention, each of the plurality of radial position shift portions may be bent radially outward from an end of the in-slot portion which adjoins the turn portion. Otherwise, each of the plurality of radial position shift portions may be bent radially inward from an end of the in-slot portion which adjoins the turn portion.

Alternatively, the plurality of radial position shift portions of the electric wires may be divided into first and second types. Each of the first-type radial position shift portions is bent radially outward from an end of the in-slot portion which adjoins the turn portion. Each of the second-type radial position shift portions is bent radially inward from an end of the in-slot portion which adjoins the turn portion.

According to further implementations of the invention, the plurality of radial position shift portions are divided into a plurality of types. The amounts of radial position shift made by the radial position shift portions of the same type are equal to each other. The amounts of radial position shift made by the radial position shift portions of different types are different from each other.

Further, the amounts of radial position shift made by the plurality of types of the radial position shift portions vary in the circumferential direction of the stator core.

The plurality of types of the radial position shift portions form a plurality of first radial position shift portion groups in each of which the amounts of radial position shift made by the radial position shift portions vary in the circumferential direction of the stator core. The plurality of first radial position shift portion groups are cyclically arranged in the circumferential direction of the stator core.

The electric rotating machine is m-phase, p-pole AC machine, where m is an integer greater than zero and p is a positive even number. The number of the slots formed in the stator core is equal to m×p×n, where n is an integer greater than zero. Each pair of the in-slot portions connected by one of the turn portions of the electric wires are respectively received in a pair of the slots of the stator core which are spaced m×n slots apart in the circumferential direction of the stator core. The plurality of first radial position shift portion groups are arranged in the circumferential direction of the stator core in a cycle of m×n slots.

The plurality of types of the radial position shift portions further form a plurality of second radial position shift portion groups in each of which the amounts of radial position shift made by the radial position shift portions are set to a constant value. The stator coil is formed by stacking the plurality of electric wires to form a flat band-shaped electric wire assembly and rolling the electric wire assembly by a predetermined number of turns into a hollow cylindrical shape. In at least one of the radially innermost and radially outermost turns of the stator coil, the first radial position shift portion groups are alternately arranged with the second radial position shift portion groups in the circumferential direction of the stator core.

Each of the plurality of radial position shift portions is provided at a root part of the one of the turn portions of the electric wire to adjoin the one of the in-slot portions of the electric wire.

At least one of the electric wires has no radial position shift portion formed therein.

Each of the turn portions of the electric wires is stepped to include a plurality of shoulder parts that extend parallel to an axial end face of the stator core from which the turn, portion protrudes.

All the axial distances between the bend start positions of the plurality of radial position shift portions and corresponding axial end facts of the stator core are equal.

Each of the plurality of radial position shift portions is substantially crank-shaped to include a straight part at the center thereof and a pair of first and second bent parts respectively on opposite sides of the straight part.

The thickness of the straight part on a reference plane, which is defined to extend perpendicular to the circumferential direction of the stator core, may be set to be less than the radial thickness of other portions of the electric wire. Alternatively, the cross-sectional area of the straight part perpendicular to the extending direction of the electric wire may be set to be less than that of other portions of the electric wire perpendicular to the same.

Each of the electric wires is made up of an electric conductor having a rectangular cross section and an insulating coat covering the surface of the electric conductor. Further, the insulating coat is two-layer structured to include an inner layer and an outer layer.

The stator coil is a hollow cylindrical electric wire assembly that is formed by rolling a flat band-shaped electric wire assembly by a predetermined number of turns. The flat band-shaped electric wire assembly is formed by stacking the plurality of electric wires.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings.

DESCRIPTION OF PREFERRED EMBODIMENTS

Figure 1:
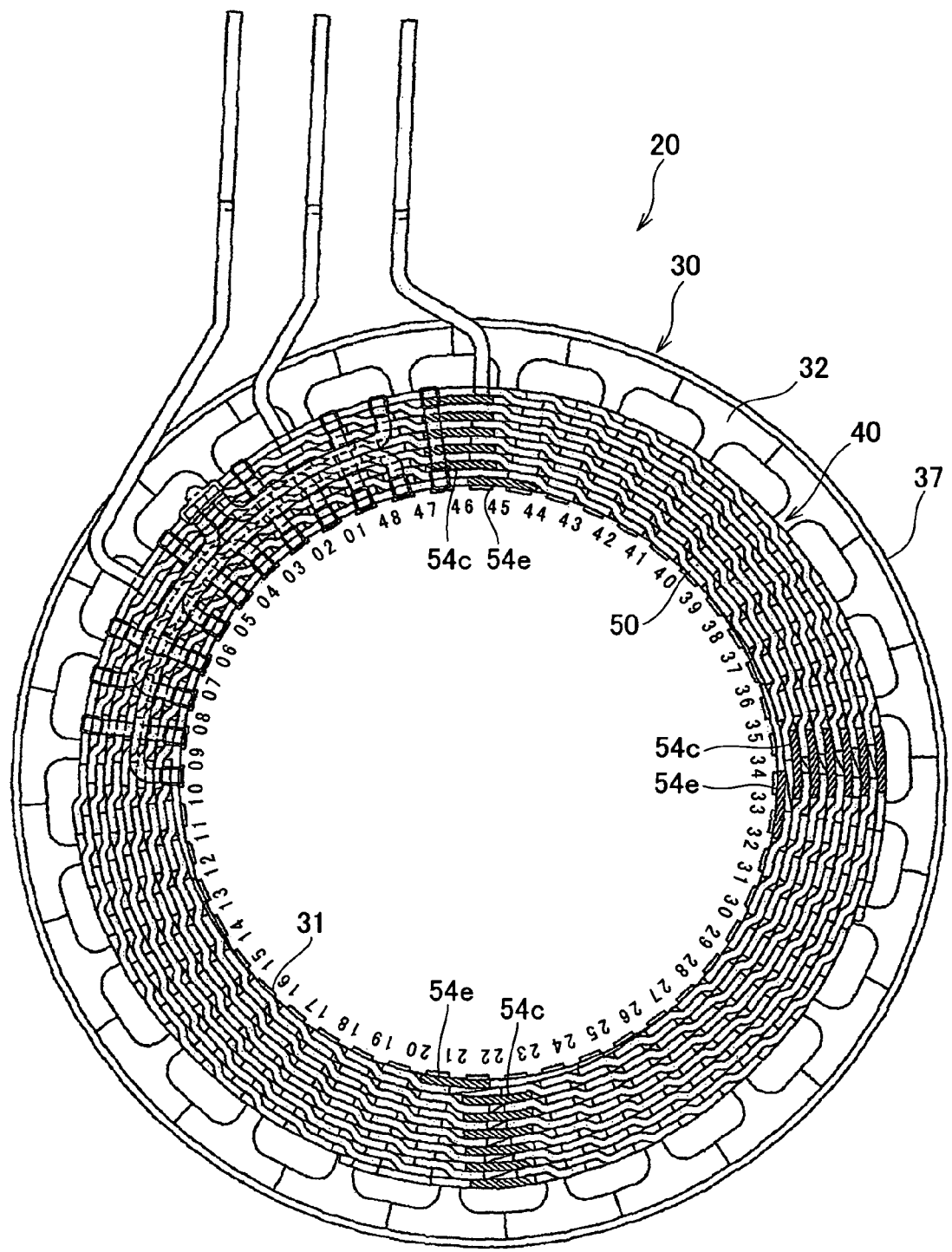
FIG. 1 is a top view of a stator according to the first embodiment of the invention.

Preferred embodiments of the present invention will be described hereinafter with reference to FIGS. 1-26. It should be noted that, for the sake of clarity and understanding, identical components having identical functions in different embodiments of the invention have been marked, where possible, with the same reference numerals in each of the figures.

First Embodiment

FIG. 1-4 together show the overall configuration of a stator 20 according to the first embodiment of the invention. The stator 20 is designed for use in, for example, an electric rotating machine which is configured to function both as an electric motor and as an electric generator in a motor vehicle. The electric rotating machine further includes a rotor (not shown) that is rotatably disposed so as to be surrounded by the stator 20. The rotor includes a plurality of permanent magnets that form a plurality of magnetic poles on a radially outer periphery of the rotor to face a radially inner periphery of the stator. The polarities of the magnetic poles alternate between north and south in the circumferential direction of the rotor. In addition, in the present embodiment, the number of the magnetic poles formed in the rotor is equal to eight (i.e., four north poles and four south poles).

As shown in FIGS. 1-4, the stator 20 includes a hollow cylindrical stator core 30 and a three-phase stator coil 40 that is made up of a plurality of (e.g., twelve in the present embodiment) wave-shaped electric wires 50 wound around the stator core 30. In addition, the stator 20 may further include insulating paper sheets interposed between the stator core 30 and the stator coil 40.

The stator core 30 has a plurality of slots 31 that are formed in the radially inner surface of the stator core 30 and spaced in the circumferential direction of the stator core 30 at predetermined intervals. For each of the slots 31, the depth-wise direction of the slot 31 is coincident with the radial direction of the stator core 30. In the present embodiment, with respect to each of the eight magnetic poles of the rotor, there are provided two slots 31 for each of the three phases of the stator coil 40. Accordingly, the total number of the slots 31 provided in the stator core 30 is equal to 48 (i.e., 8×3×2). In addition, in FIGS. 1 and 2, slot numbers 1-48 are respectively given to the 48 slots 31, at the same circumferential positions as the respective slots 31, so as to distinguish the slots 31 from one another.

Moreover, in the present embodiment, the stator core 30 is made up of, for example, 24 stator core segments that are connected together to adjoin one another in the circumferential direction of the stator core 30. On the radially outer surfaces of the stator core segments, there is fitted a cylindrical outer rim 37. Each of the stator core segments defines therein one of the slots 31. Further, each circumferentially-adjoining pair of the stator core segments together defines one of the slots 31 therebetween. In addition, in the present embodiment, each of the stator core segments is formed by laminating a plurality of magnetic steel sheets with a plurality of insulting films interposed therebetween. It should be noted that other conventional metal sheets may also be used instead of the magnetic steel sheets.

Figure 5:
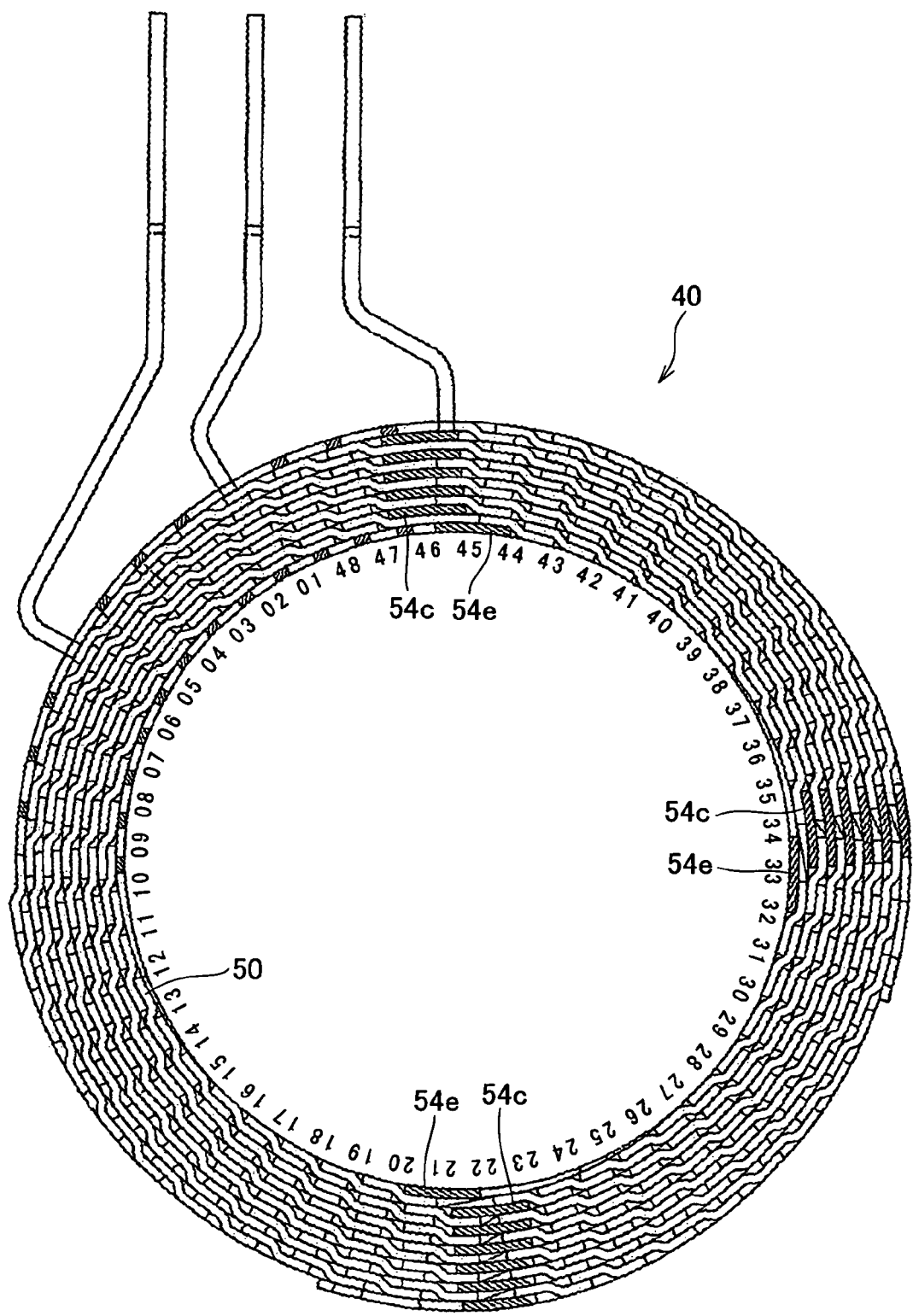
FIG. 5 is a top view of a stator coil of the stator according to the first embodiment.
Figure 6:
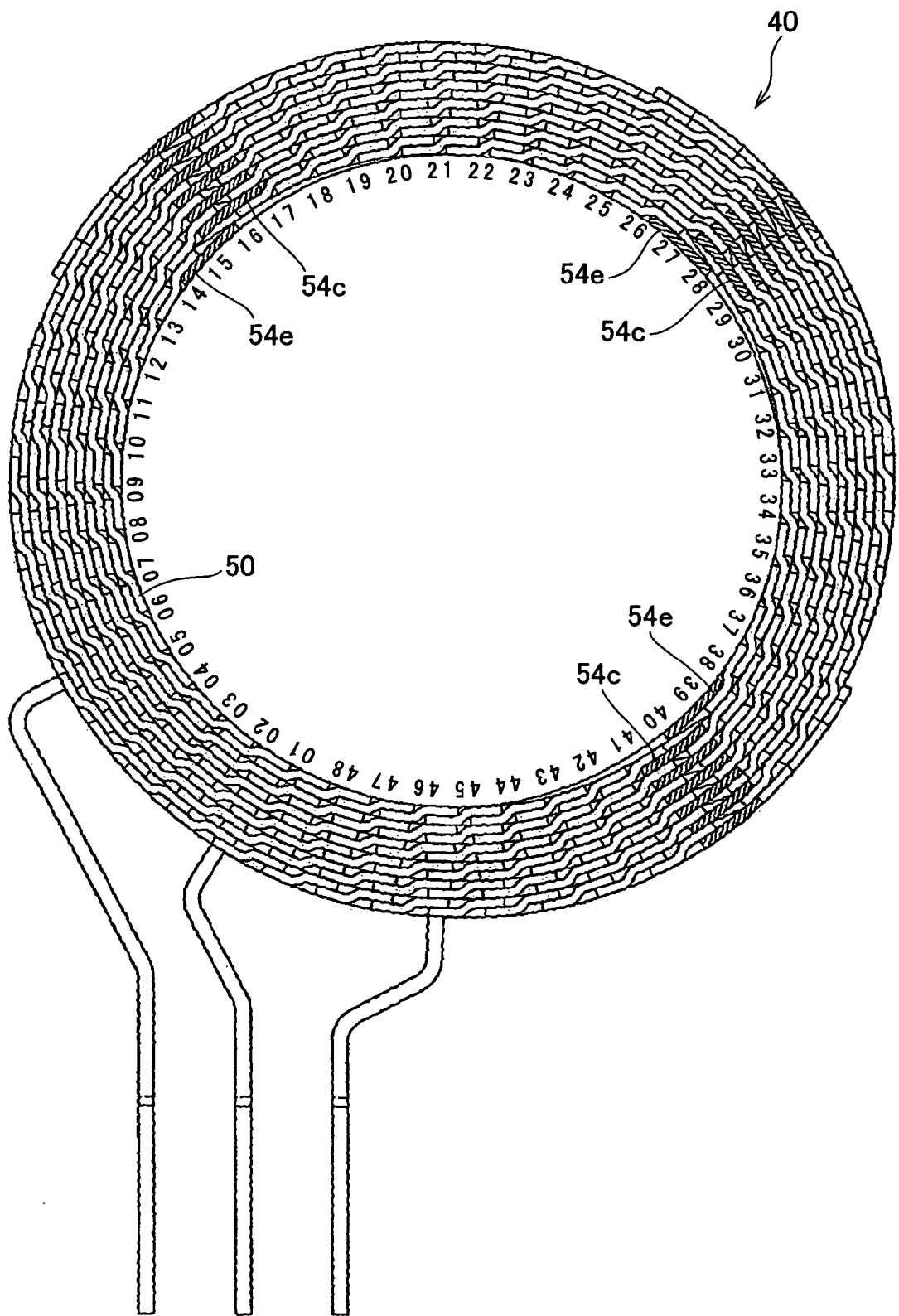
FIG. 6 is a bottom view of the stator coil.
Figure 7:
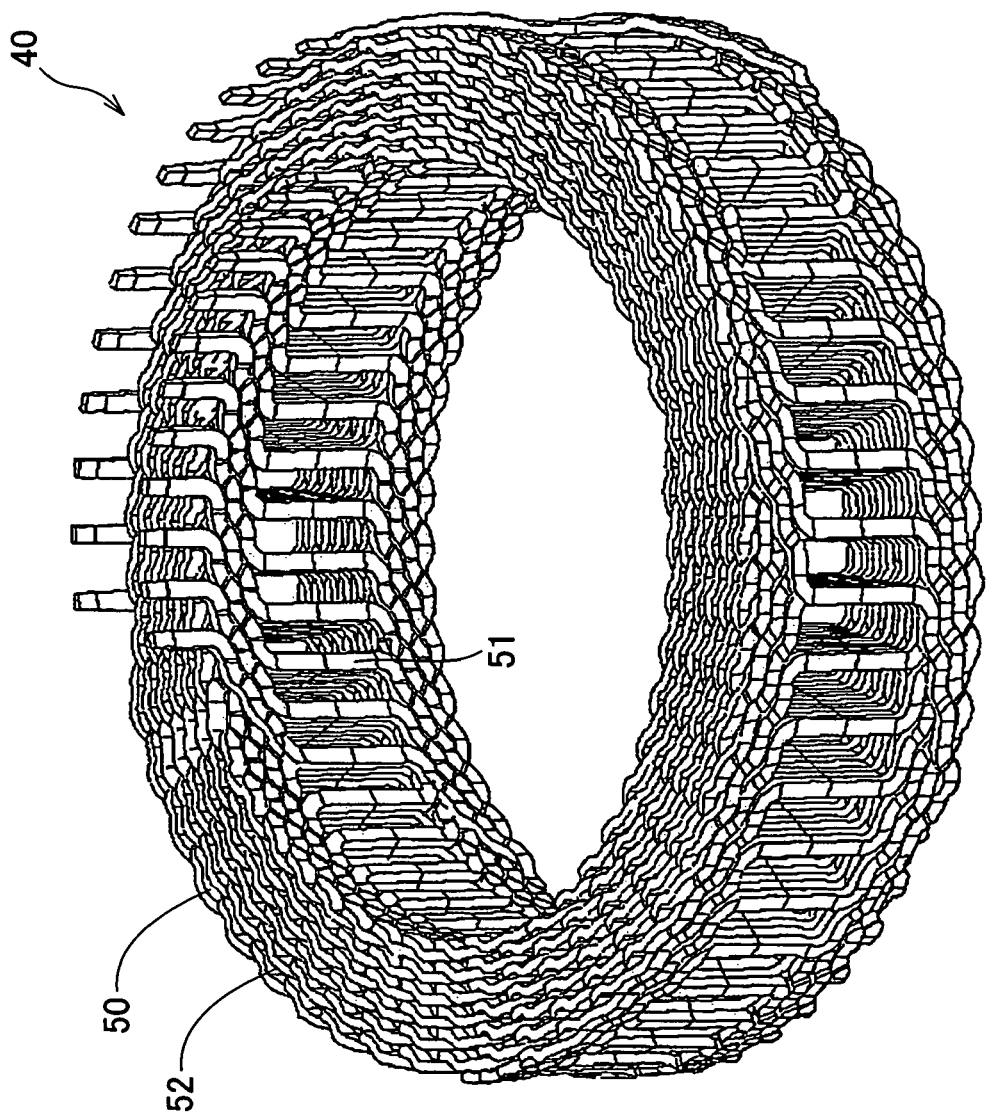
FIG. 7 is a perspective view of the stator coil.
Figure 8:
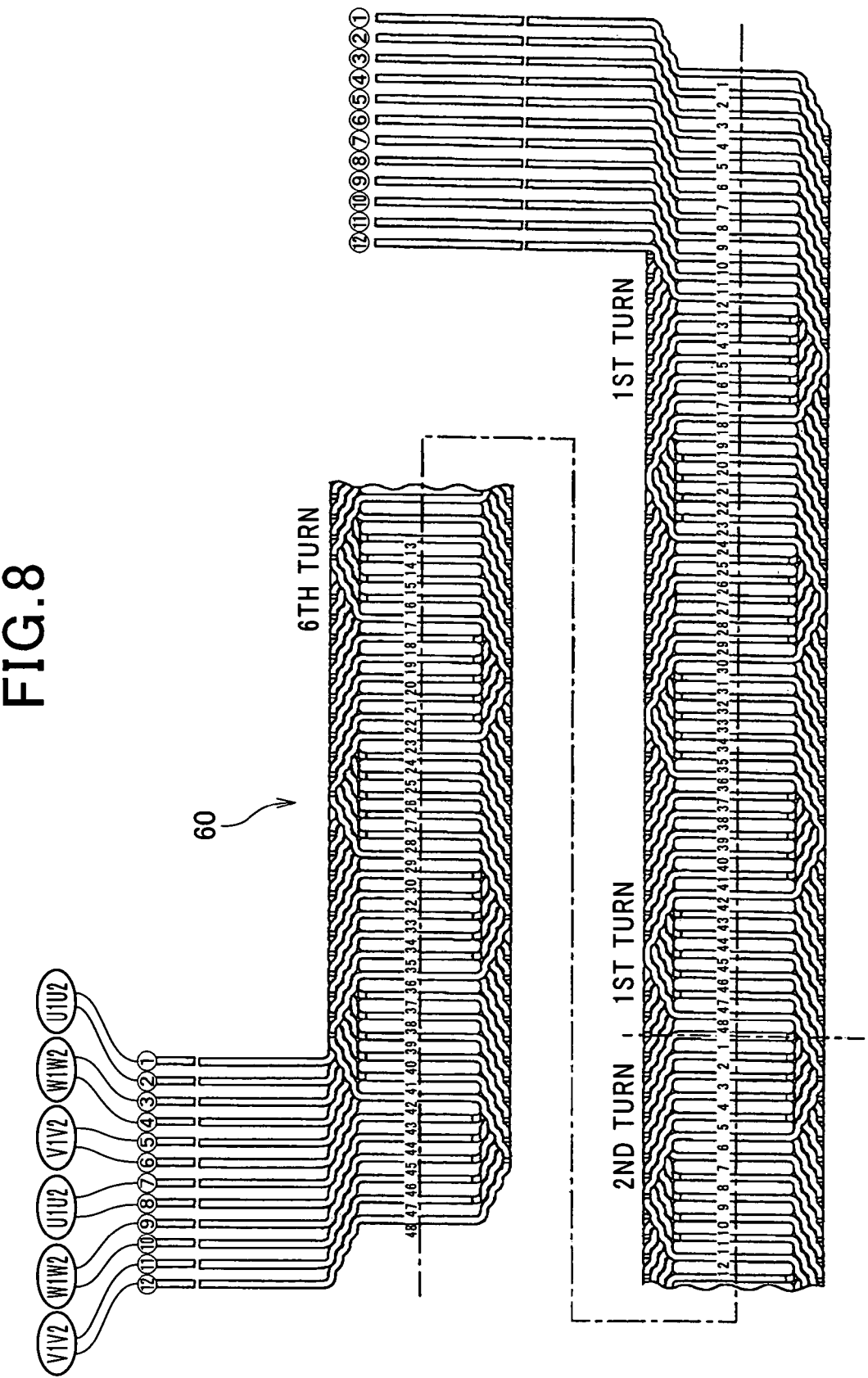
FIG. 8 is a front view of an electric wire assembly for forming the stator coil.
Figure 9:
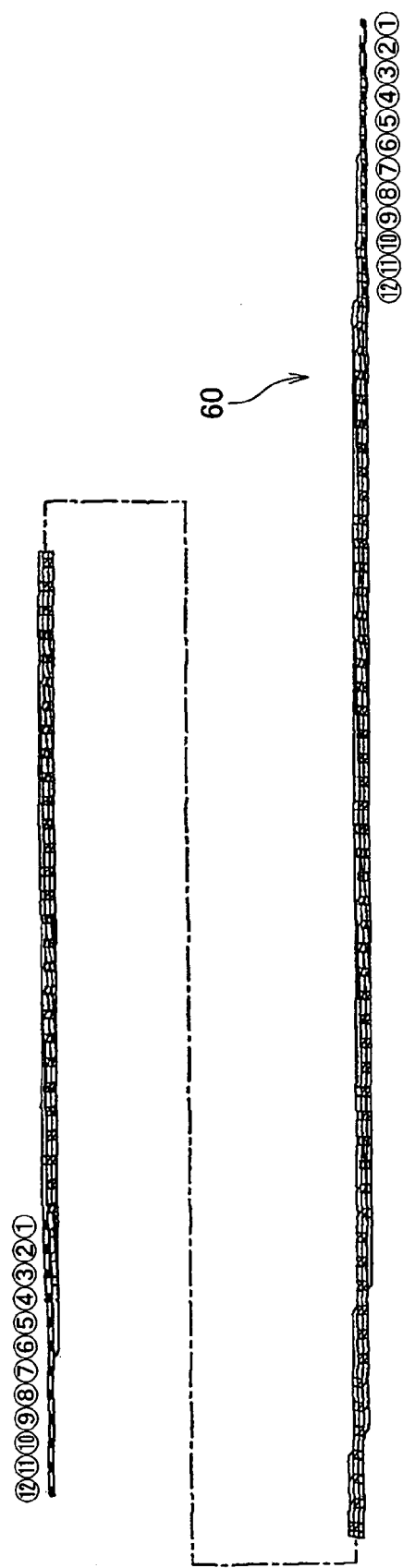
FIG. 9 is a top view of the electric wire assembly.

FIGS. 5-7 together show the overall configuration of the stator coil 40. In the present embodiment, the stator coil 40 is manufactured by stacking the twelve wave-shaped electric wires 50 to form a flat band-shaped electric wire assembly 60 as shown in FIGS. 8-11 and rolling the flat band-shaped electric wire assembly 60 by a predetermined number of turns (e.g., six turns) into a hollow cylindrical shape. In addition, in FIGS. 8-11, the twelve wave-shaped electric wires 50 are numbered with circled numbers 1-12.

Figure 23A:
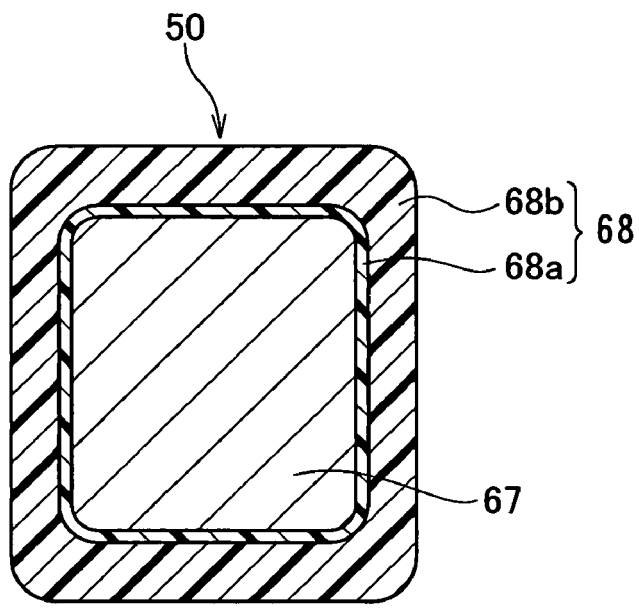
FIG. 23A is a schematic cross-sectional view illustrating the configuration of the electric wires for forming the stator coil according to the first embodiment.

Each of the electric wires 50 for forming the stator coil 40 is configured with, as shown in FIG. 23A, an electric conductor 67 and an insulating coat 68 that covers the outer surface of the electric conductor 67. In the present embodiment, the electric conductor 67 is made of copper and has a rectangular cross section. With the rectangular cross section, it is possible to mount the electric wires 50 on the stator core 30 at high density.

Moreover, in the present embodiment, the insulating coat 68 is two-layer structured to include an inner layer 68a and an outer layer 68b. The thickness of the insulating coat 68 (i.e., the sum of thicknesses of the inner and outer layers 68a and 68b) is set to be in the range of 100 to 200 μm.

With such a large thickness of the two-layer structured insulating coat 68, it is possible to reliably insulate the electric wires 50 from one another without interposing insulating paper sheets therebetween. However, it is also possible to interpose insulating paper sheets between the electric wires 50 so as to further enhance the electrical insulation therebetween.

Further, the outer layer 68b is made of an insulating material such as nylon. The inner layer 68a is made of an insulating material having a higher glass transition temperature than the outer layer 68b, such as a thermoplastic resin or a polyimide-imide resin. Consequently, the outer layers 68b of the electric wires 50 will be softened by the heat generated by operation of the electric rotating machine earlier than the inner layers 68a, thereby bonding together those portions of the electric wires 50 which are received in the same ones of the slots 31 of the stator core 30. As a result, those portions of the electric wires 50 will be integrated into a rigid body, thereby enhancing the mechanical strength thereof. In addition, for each of the electric wires 50, when excessive vibration occurs, the outer layer 68b will be first separated from the inner layer 68a, leaving the inner layer 68a to keep covering the outer surface of the electric conductor 67. As a result, the electrical insulation between the electric wires 50 can be maintained.

Figure 23B:
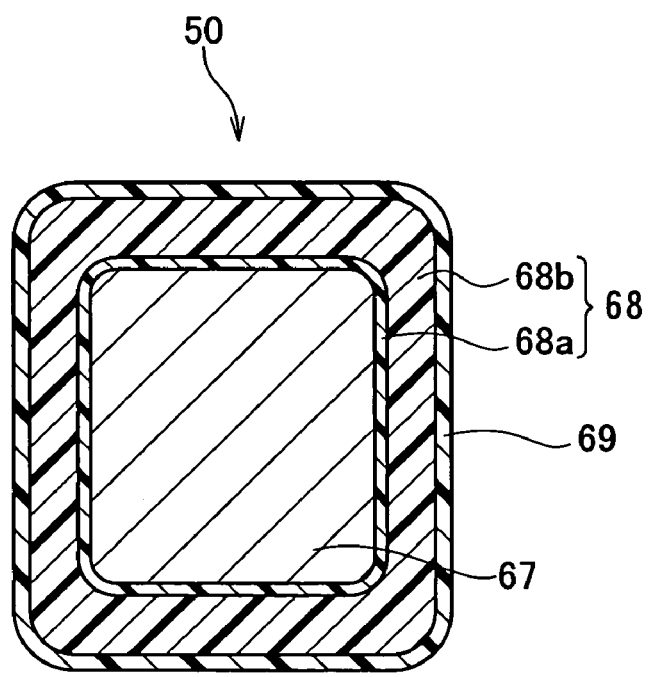
FIG. 23B is a schematic cross-sectional view illustrating a modification of the configuration of the electric wires shown in FIG. 23A.

Furthermore, as shown in FIG. 23B, it is also possible for each of the electric wires 50 to further include a fusible coat 69 to cover the outer surface of the insulating coat 68; the fusible coat 69 may be made, for example, of epoxy resin. In this case, the fusible coats 69 of the electric wires 50 will be fused by the heat generated by operation of the electric rotating machine earlier than the insulating coats 68, thereby bonding together those portions of the electric wires 50 which are received in the same ones of the slots 31 of the stator core 30. As a result, those portions of the electric wires 50 will be integrated into a rigid body, thereby enhancing the mechanical strength thereof. In addition, in this case, the outer layers 68b of the insulating coats 68 of the electric wires 50 may also be made of PPS (polyphenylene sulfide).

In the present embodiment, three different types of electric wires are employed as the electric wires 50 for forming the stator coil 40. More specifically, one electric wire 50A as shown in FIG. 12 is employed as the No. 1 electric wire 50; one electric wire 50B as shown in FIG. 13 is employed as the No. 12 electric wire 50; and ten electric wires 50C as shown in FIG. 14 are employed as the No. 2-No. 11 electric wires 50.

Figure 12:
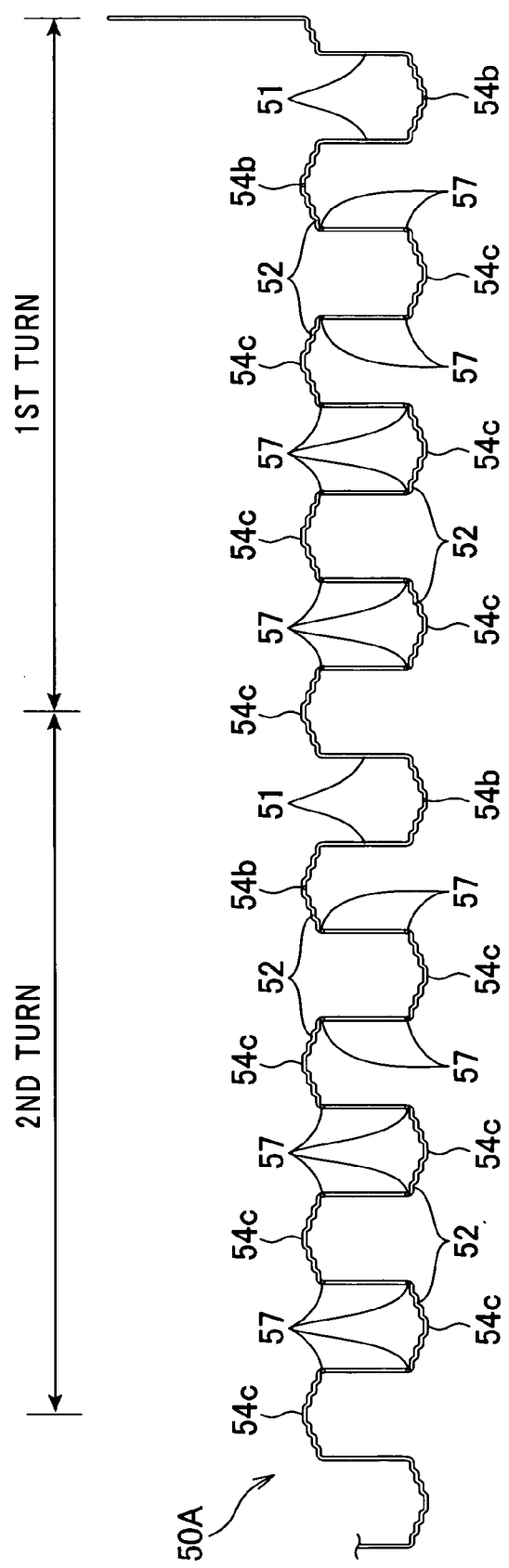
FIG. 12 is a front view of an end portion of a first-type electric wire for forming the electric wire assembly.
Figure 13:
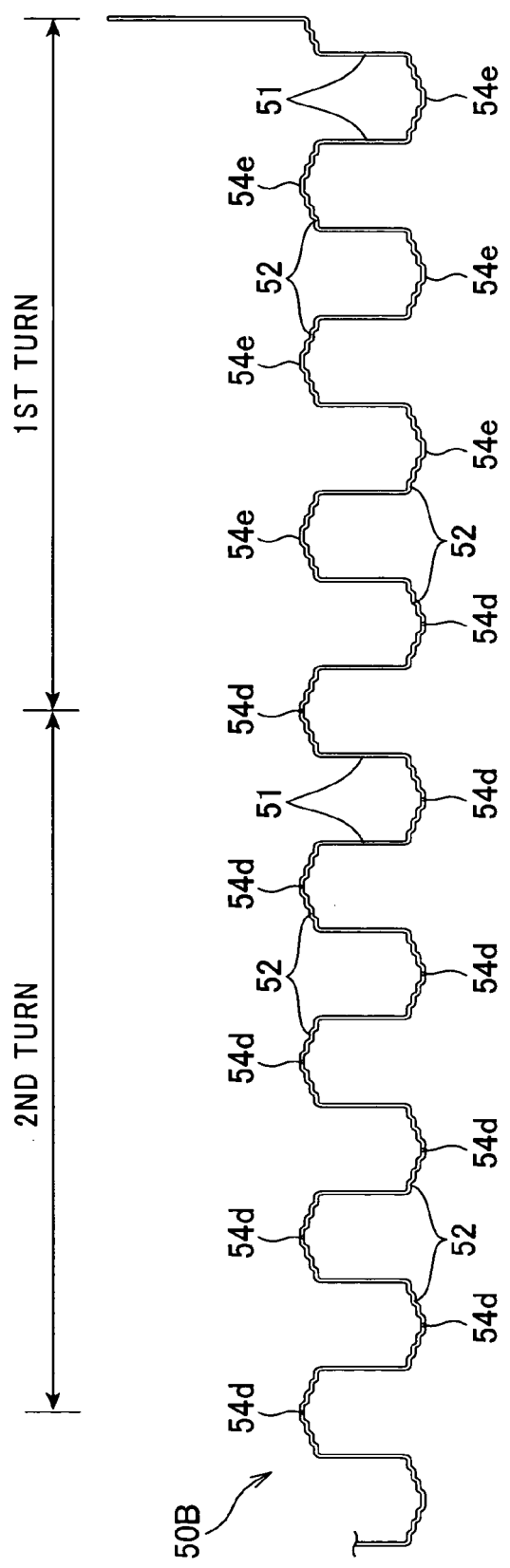
FIG. 13 is a front view of an end portion of a second-type electric wire for forming the electric wire assembly.
Figure 14:
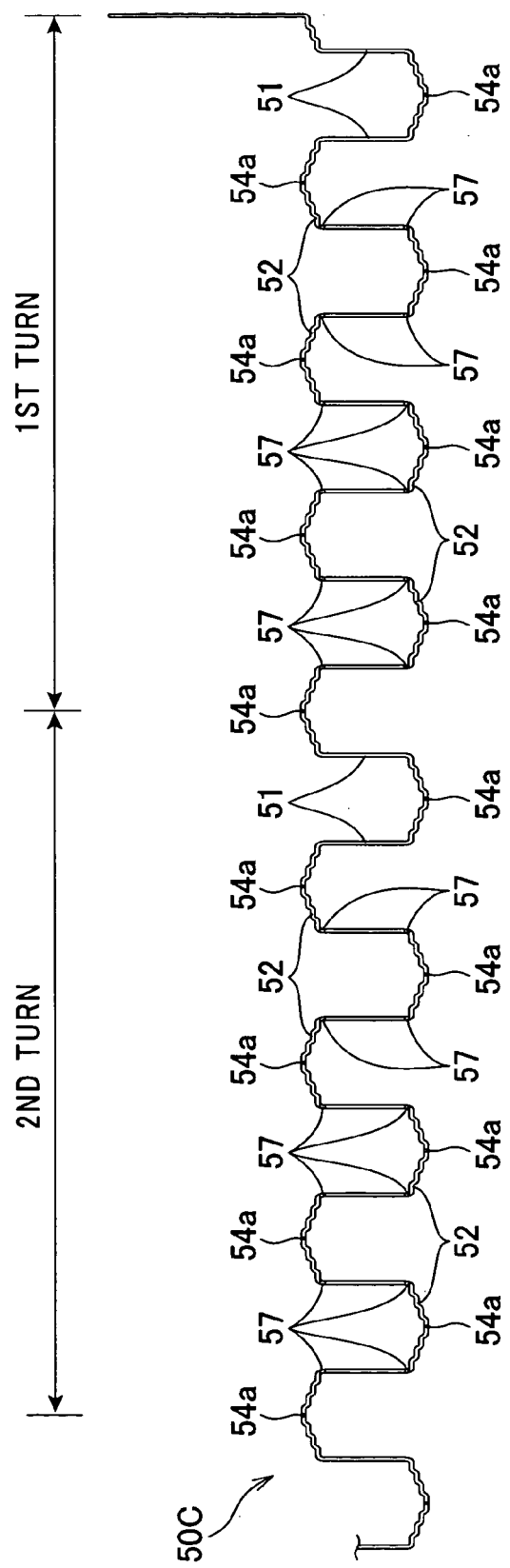
FIG. 14 is a front view of an end portion of a third-type electric wire for forming the electric wire assembly.

As shown in FIGS. 12-14, each of the twelve electric wires 50A-50C is wave-shaped to include a plurality of in-slot portions 51 and a plurality of turn portions 52.

The in-slot portions 51 are equally spaced in the longitudinal direction of the electric wire and extend perpendicular to the longitudinal direction. After assembling the stator core 30 to the stator coil 40, each of the in-slot portions 51 is received in a corresponding one of the slots 31 of the stator core 30.

Each of the turn portions 52 extends, on one side of the in-slot portions 51, with a turn to connect one adjacent-pair of the in-slot portions 51. After assembling the stator core 30 to the stator coil 40, each of the turn portions 52 is located outside of the slots 31 of the stator core 30.

The flat band-shaped electric wire assembly 60 shown in FIGS. 8-11 is formed by sequentially stacking the twelve electric wires 50A-50C with, the No. 1 electric wire 50A lying at the bottom and with the No. 12 electric wire 50B lying at the top. Further, the twelve electric wires 50A-50C are so stacked that they are offset from one another in the longitudinal direction of the electric wire assembly 60 by a distance equal to the pitch of the slots 31 of the stator core 30. Consequently, the in-slot portions 51 of the No. 1 electric wire 50A respectively overlap with those of the No. 7 electric wire 50C; the in-slot portions 51 of the No. 2 electric wire 50C respectively overlap with those of the No. 8 electric wire 50C; the in-slot portions 51 of the No. 3 electric wire 50C respectively overlap with those of the No. 9 electric wire 50C; the in-slot portions 51 of the No. 4 electric wire 50C respectively overlap with those of the No. 10 electric wire 50C; the in-slot portions 51 of the No. 5 electric wire 50C respectively overlap with those of the No. 11 electric wire 50C; and the in-slot portions 51 of the No. 6 electric wire 50C respectively overlap with those of the No. 12 electric wire 50B. Each overlapping pair of the in-slot portions 51 of the electric wires 50A-50C are received in the same one of the slots 31 of the stator core 30.

In the present embodiment, there are the following similarities between the electric wires 50A, 50B, and 50C.

First, all of the in-slot portions 51 of the electric wires 50A-50C are formed to be identical to each other.

Secondly, as shown in FIGS. 15-18, each of the turn portions 52 of the electric wires 50A-50C includes, at the center thereof, an apex part 53 which is to be located axially furthest in the turn portion 52 from a corresponding axial end face 32 of the stator core 30 and extend parallel to the corresponding axial end face 32.

Thirdly, each of the turn portions 52 of the electric wires 50A-50C includes a pair of shoulder parts 55 which respectively adjoin the pair of in-slot portions 51 connected by the turn portion 52 and both extend perpendicular to the in-slot portions 51 (or parallel to the corresponding axial end face 32 of the stator core 30). Consequently, with the shoulder parts 55, the protruding height of each of the turn portions 52 from the corresponding axial end face 32 of the stator core 30 can be reduced. As a result, the axial length of coil ends of the stator coil 40 can be reduced. Here, the coil ends of the stator coil 40 denote the two axial end portions of the stator coil 40 which respectively protrude from the two opposite axial end faces 32 of the stator core 30 and are each made up of the turn portions 52 of the electric wires 50A-50C located on the same axial side of the stator core 30.

Figure 17A:
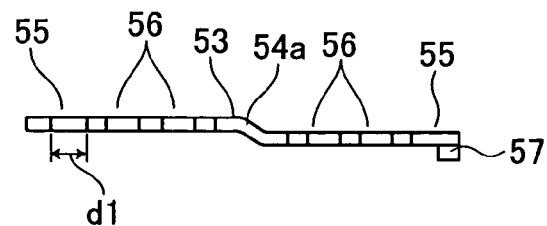
FIGS. 17A and 17B are respectively enlarged top and front views of a portion of the third-type electric wire.
Figure 18A:
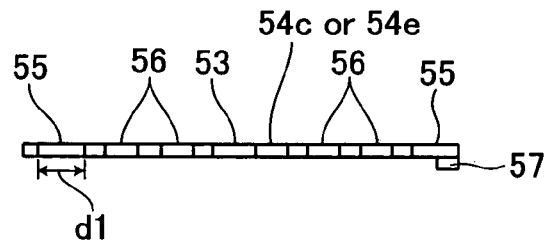
FIGS. 18A and 18B are respectively enlarged top and front views of a portion of the first-type or second-type electric wire.
Figure 19:
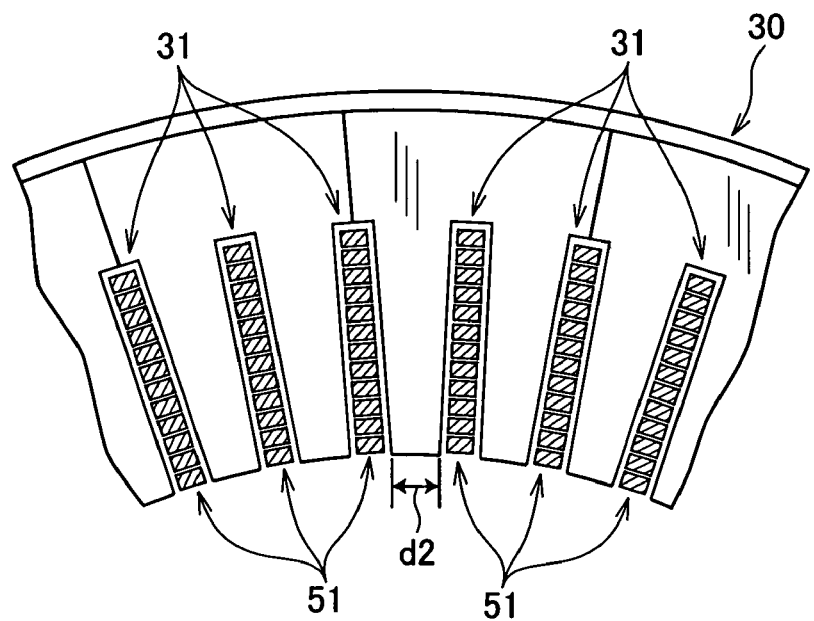
FIG. 19 is a schematic cross-sectional view illustrating high space factors of the electric wires in slots of the stator core which are achieved according to the first embodiment.

Further, in the present embodiment, there is specified the following dimensional relationship: d1<d2, where d1 is the length of each of the shoulder parts 55 of the electric wires 50A-50C as shown in FIGS. 15A, 16A, 17A, and 18A, and d2 is the distance between each circumferentially-adjacent pair of the slots 31 of the stator core 30 as shown in FIG. 19.

Specifying the above relationship, it is possible to prevent interference between each pair of the turn portions 52 of the electric wires 50A-50C which respectively protrude from one circumferentially-adjacent pair of the slots 31 of the stator core 30. Consequently, it is possible to prevent both the axial length and radial width of the coil ends of the stator coil 40 from being increased for preventing the above-described interference.

Fourthly, each of the turn portions 52 of the electric wires 50A-50C further includes two shoulder parts 56 between the apex part 53 and each of the shoulder parts 55. Accordingly, each of the turn portions 52 of the electric wires 50A-50C includes one apex part 53, two shoulder parts 55, and four shoulder parts 56. Each of the shoulder parts 56 extends, like the shoulder parts 55, perpendicular to the in-slot portions 51 (or parallel to the corresponding axial end face 32 of the stator core 30). Consequently, with the shoulder parts 56, the protruding height of each of the turn portions 52 from the corresponding axial end face 32 of the stator core 30 can be further reduced. As a result, the axial length of the coil ends of the stator coil 40 can be further reduced.

In addition, each of the turn portions 52 of the electric wires 50A-50C can be seen as being stepped on both sides of the apex part 53 to reduce its protruding height from the corresponding axial end face 32 of the stator core 30.

In the present embodiment, there are also the following differences between the electric wires 50A, 50B, and 50C.

Figure 15A:
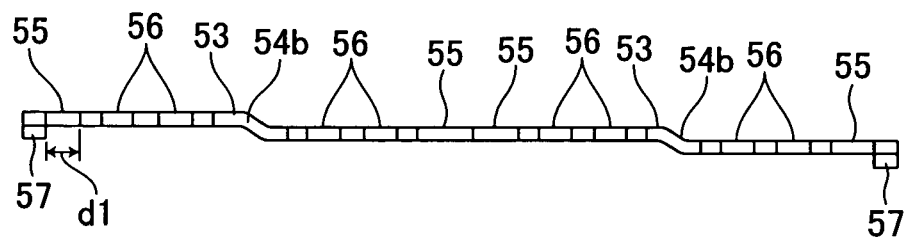
FIGS. 15A and 15B are respectively enlarged top and front views of a portion of the first-type electric wire.
Figure 15B:
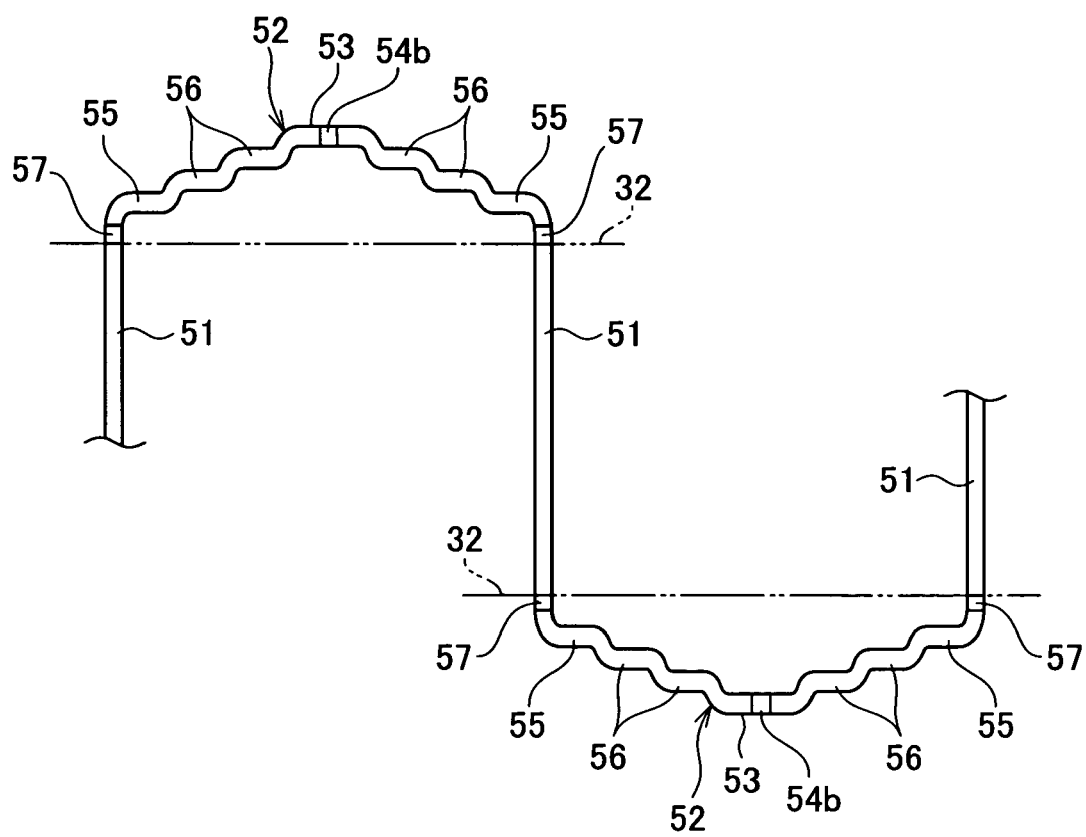

First, the electric wire 50A, which is employed as the No. 1 electric wire 50 for forming the stator coil 40, includes a plurality of radial position shift portions 57. As shown in FIGS. 12 and 15A-15B, each of the radial position shift portions 57 is provided at a root part of one of the turn portions 52 of the electric wire 50A and bent radially outward from an end of one of the in-slot portions 51 of the electric wire 50A to shift the radial position of the electric wire 50A outward.

In the present embodiment, for each turn (or round) of the stator coil 40, counting from the rolling start side (i.e., the right side in FIG. 12), no radial position shift portions 57 are formed to adjoin the first and second in-slot portions 51 of the electric wire 50A. However, for each of the third to eighth in-slot portions 51 of the electric wire 50A, there are two radial position shift portions 57 bent radially outward respectively from the opposite ends of the in-slot portion 51.

Further, in the present embodiment, the amount of radial position shift made by each of the radial position shift portions 57 is set to be substantially equal to the radial thickness of the electric wire 50A. Here, the amount of radial position shift made by each of the radial position shift portions 57 is defined as the difference in radial position between two parts of the electric wire 50A which adjoin the radial position shift portion 57 respectively from opposite sides of the radial position shift portion 57. More specifically, the two parts of the electric wire 50A respectively correspond to the end of the in-slot portion 51 which adjoins the radial position shift portion 57 from one side thereof and a part of the turn portion 52 which adjoins the radial position shift portion 57 from the other side.

Figure 21:
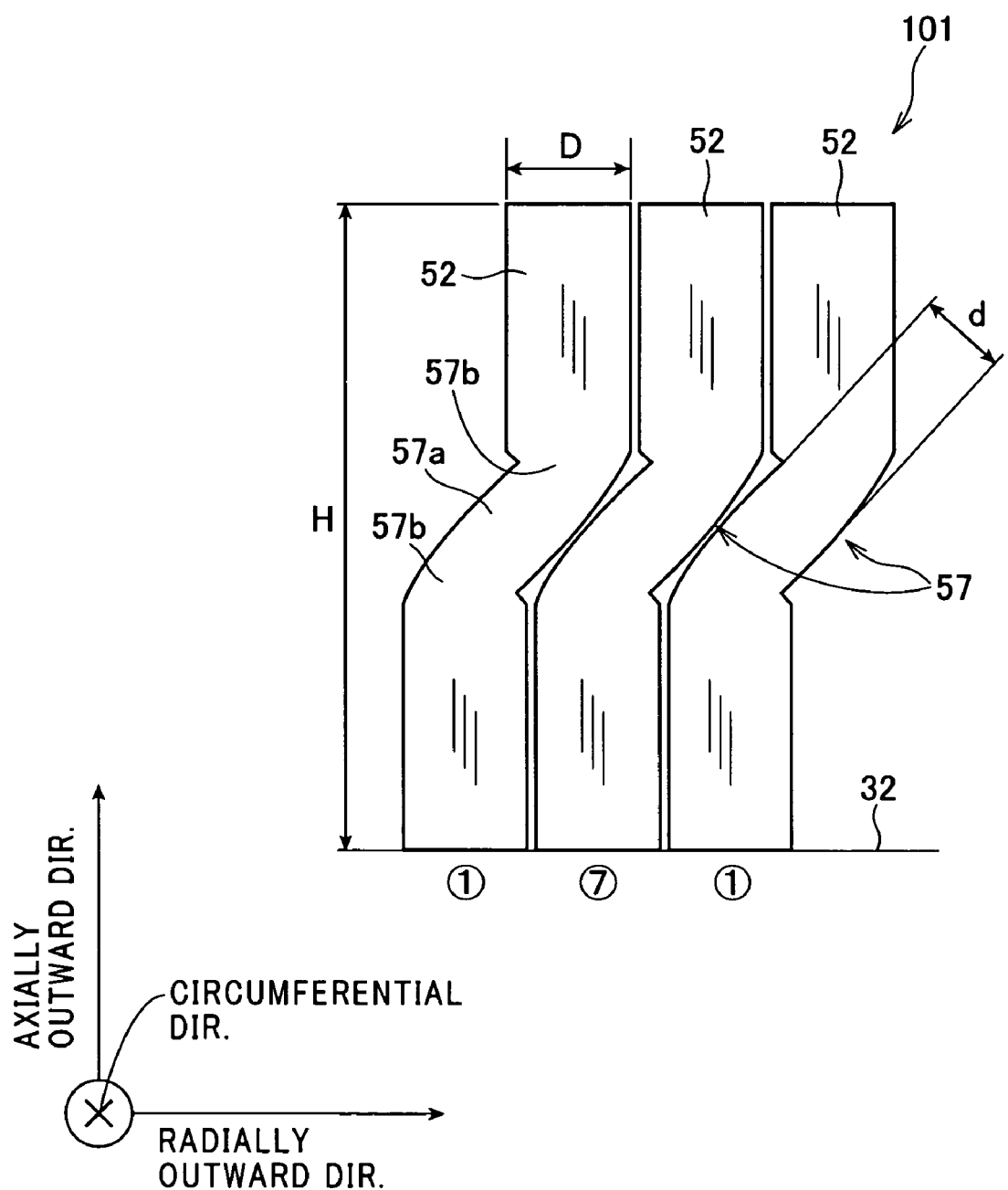
FIG. 21 is a schematic view illustrating the configuration of radial position shift portions of the electric wires according to the first embodiment.

FIG. 21 shows the configuration of each of the radial position shift portions 57 on a reference plane 101 that is defined to extend perpendicular to the circumferential direction of the stator core 30.

As shown in FIG. 21, each of the radial position shift portions 57 includes a straight part 57a at the center thereof and a pair of first and second bent parts 57b respectively on opposite sides of the straight part 57a. Specifically, each of the radial position shift portions 57 is first bent radially outward to form the first bent part 57b, extends straight to form the straight part 57a, and then bent axially outward to form the second bent part 57b. That is, in the present embodiment, each of the radial position shift portions 57 is bent twice to have a substantially crank shape. In this case, the amount of radial position shift made by each of the radial position shift portions 57 is equal to the difference in radial position between the first and second bent parts 57b.

In addition, though not shown in FIG. 21, the electric wire 50A is further bent from the axial direction of the stator core 30 to the circumferential direction of the same after being bent at the second bent part 57b. It should be noted that each of the radial position shift portions 57 may also be bent from the extending direction of the straight part 57a directly to the circumferential direction of the stator core 30, thereby omitting the second bent part 57b. That is to say, the shape of each of the radial position shift portions 57 is not restricted to the crank shape as shown in FIG. 21.

Furthermore, in the present embodiment, each of the radial position shift portions 57 is so formed that the thickness d of the straight part 57a on the reference plane 101 is less than the radial thickness D of other portions of the electric wire 50A which include the in-slot and turn portions 51 and 52.

Figure 16A:
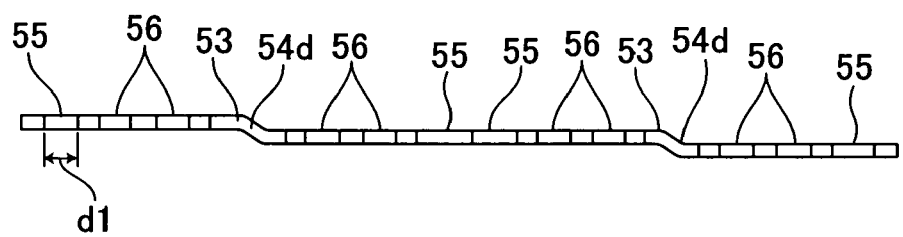
FIGS. 16A and 16B are respectively enlarged top and front views of a portion of the second-type electric wire.
Figure 16B:
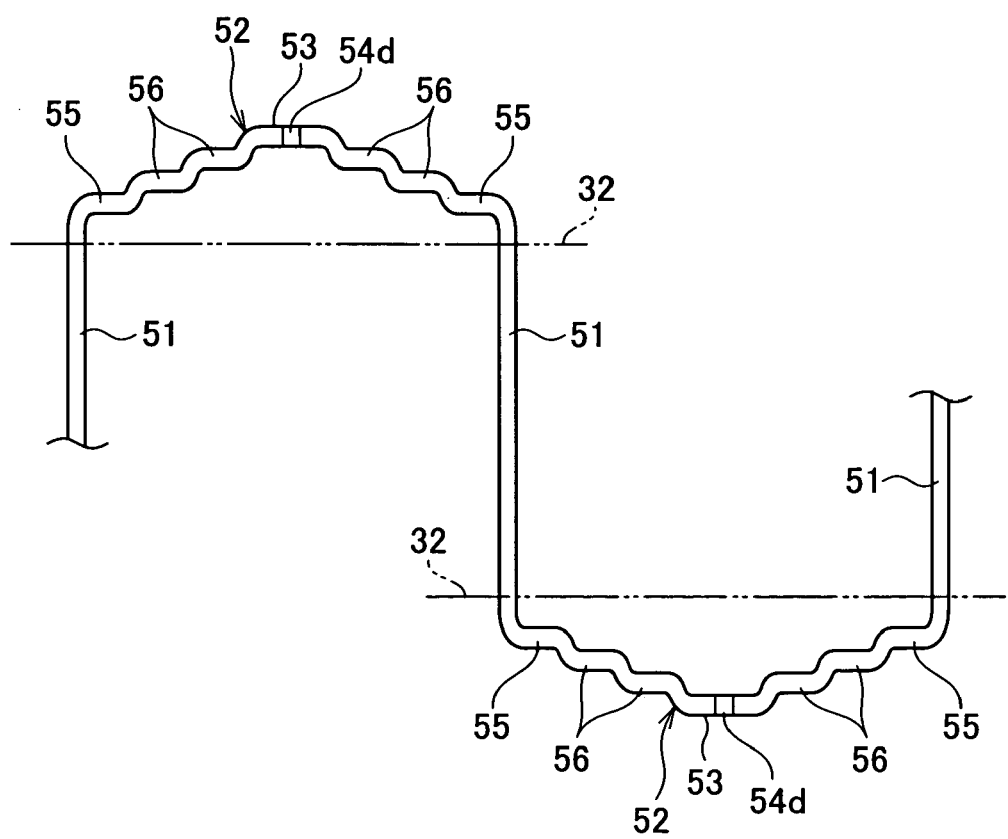

In comparison, as shown in FIGS. 13 and 16A-16B, the electric wire 50B, which is employed as the No. 12 electric wire 50 for forming the stator coil 40, includes no radial position shift portion 57.

Figure 17B:
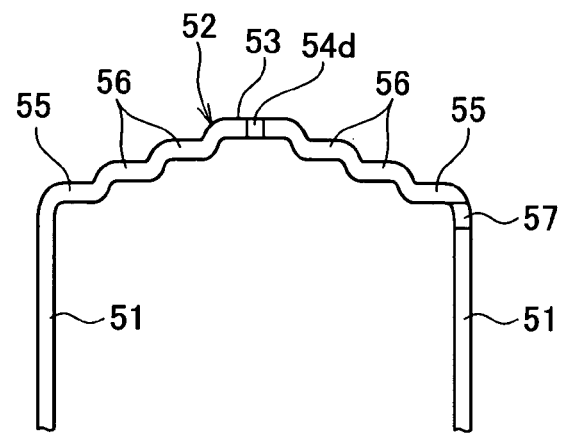

Further, among the ten electric wires 50C, the one which is employed as the No. 6 electric wire 50 for forming the stator coil 40 also includes no radial position shift portion 57. However, the other electric wires 50C, which are respectively employed as the No. 2-No. 5 and No. 7-No. 11 electric wires 50 for forming the stator coil 40, each include a plurality of radial position shift portions 57 as shown in FIGS. 14 and 17A-17B. The radial position shift portions 57 of the No. 2-No. 5 and No. 7-No. 11 electric wires 50C have the same configuration as those of the No. 1 electric wire 50A.

Moreover, in the present embodiment, for each pair of the electric wires 50A-50C which is received in the same slots 31 of the stator core 30, the amounts of radial position shift made by the radial position shift portions 57 are set to be the same.

Specifically, in the present embodiment, the in-slot portions 51 of the No. 1 electric wire 50A are received in the same slots 31 of the stator core 30 as those of the No. 7 electric wire 50C; the amount of radial position shift made by each of the radial position shift portions 57 in the No. 1 electric wire 50A is thus set to be equal to that in the No. 7 electric wire 50C. Similarly, the in-slot portions 51 of the No. 2 electric wire 50C are received in the same slots 31 of the stator core 30 as those of the No. 8 electric wire 50C; the amount of radial position shift made by each of the radial position shift portions 57 in the No. 2 electric wire 50C is thus set to be equal to that in the No. 8 electric wire 50C. The in-slot portions 51 of the No. 3 electric wire 50C are received in the same slots 31 of the stator core 30 as those of the No. 9 electric wire 50C; the amount of radial position shift made by each of the radial position shift portions 57 in the No. 3 electric wire 50C is thus set to be equal to that in the No. 9 electric wire 50C. The in-slot portions 51 of the No. 4 electric wire 50C are received in the same slots 31 of the stator core 30 as those of the No. 10 electric wire 50C; the amount of radial position shift made by each of the radial position shift portions 57 in the No. 4 electric wire 50C is thus set to be equal to that in the No. 10 electric wire 50C. The in-slot portions 51 of the No. 5 electric wire 50C are received in the same slots 31 of the stator core 30 as those of the No. 11 electric wire 50C; the amount of radial position shift made by each of the radial position shift portions 57 in the No. 5 electric wire 50C is thus set to be equal to that in the No. 11 electric wire 50C. In addition, the in-slot portions 51 of the No. 6 electric wire 50C are received in the same slots 31 of the stator core 30 as those of the No. 12 electric wire SOB; both the No. 6 electric wire 50C and the No. 12 electric wire 50B include no radial position shift portion 57.

Furthermore, in the present embodiment, the amounts of radial position shift made by the radial position shift portions 57 decrease in the order of the pair of No. 1 and No. 7 electric wires 50A and 50C, the pair of No. 2 and No. 8 electric wires 50C, the pair of No. 3 and No. 9 electric wires 50C, the pair of No. 4 and No. 10 electric wires 50C, and the pair of No. 5 and No. 11 electric wires 50C.

As described previously, the stator coil 40 is formed by stacking the twelve electric wires 50A-50C to form the flat band-shaped electric wire assembly 60 and rolling the electric wire assembly 60 by six turns into the hollow cylindrical shape. Moreover, each turn of the stator coil 40 includes two layers of the in-slot portions 51 of the electric wires 50A-50C. In the present embodiment, on the first layer (i.e., the radially inner layer) of the first turn (i.e., the radially innermost turn) of the stator coil 40, for each of the No. 7-No. 11 electric wires 50C, the amounts of radial position shift made by those radial position shift portions 57 which are respectively provided at the rolling start-side root parts of the turn portions 52 are set to zero. In other words, those radial position shift portions 57 are actually reduced to straight portions.

Figure 10:
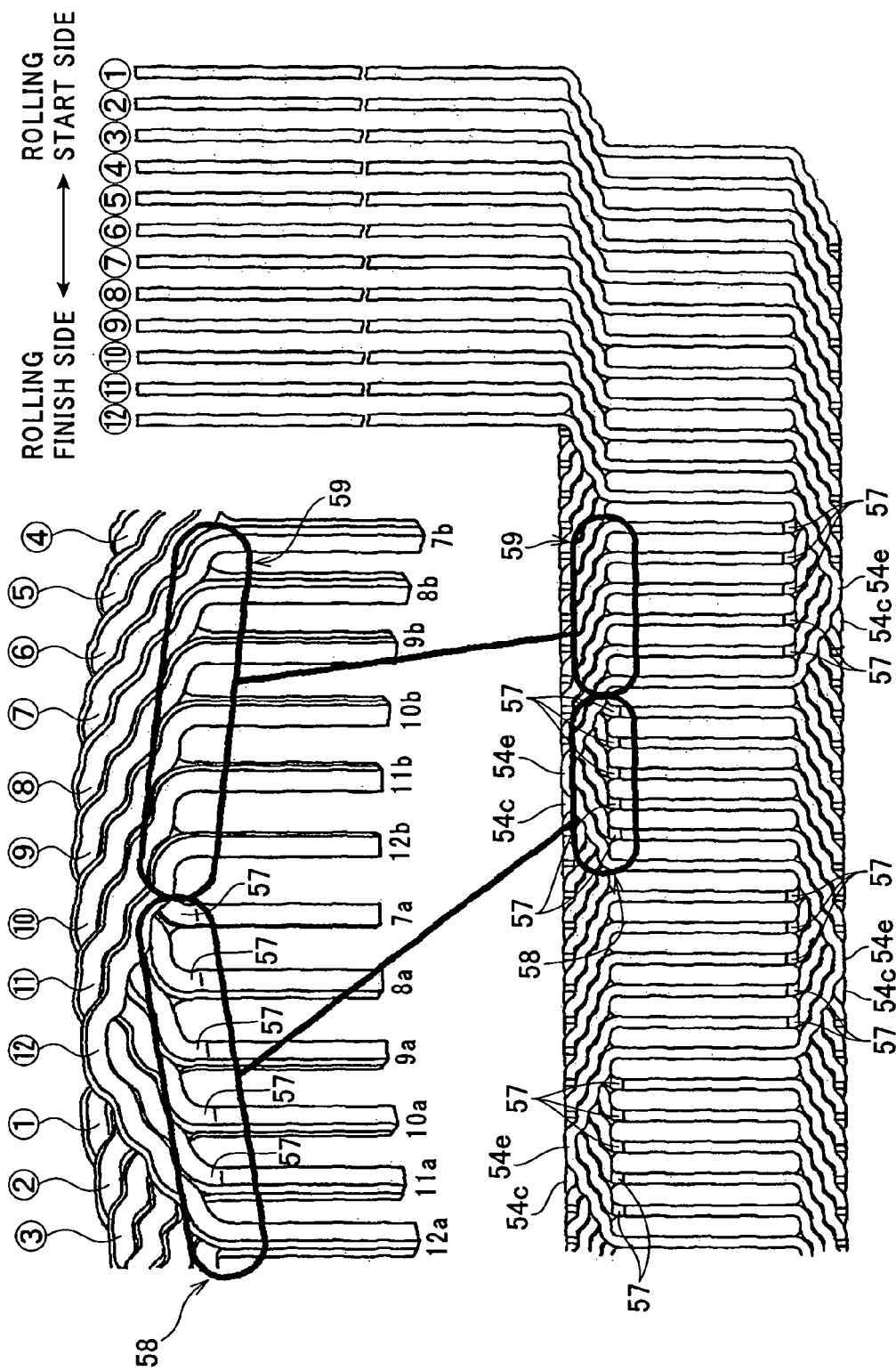
FIG. 10 is a schematic view illustrating, through enlargement, a portion of the electric wire assembly which makes up a portion of the first turn of the stator coil.

Consequently, as illustrated in FIG. 10, on the first layer of the first turn of the stator coil 40, there are formed first radial position shift portion groups 58 each of which is composed of adjacent six of those radial position shift portions 57 of the No. 7-No. 12 electric wires which are provided at the rolling finish-side root parts of the corresponding turn portions 52. In each of the first radial position shift portion groups 58, the amounts of radial position shift made by the radial position shift portions 57 decrease in the order of the No. 7, No. 8, . . . , and No. 12 electric wires. It should be noted that the No. 12 electric wire 50s is considered here as including radial position shift portions 57 the amounts of radial position shift made by which are set to zero. Moreover, on the first layer of the first turn of the stator coil 40, there are also formed second radial position shift portion groups 59 each of which is composed of adjacent six of those radial position shift portions 57 of the No. 7-No. 12 electric wires which are provided at the rolling start-side root parts of the corresponding turn portions 52. In each of the second radial position shift portion groups 59, the amounts of radial position shift made by the radial position shift portions 57 are set to a constant value, more particularly to zero in the present embodiment. Further, on each axial side of the stator core 30, the first radial position shift portion groups 58 are alternately arranged with the second radial position shift portion groups 59 in the circumferential direction of the stator core 30.

Figure 11:
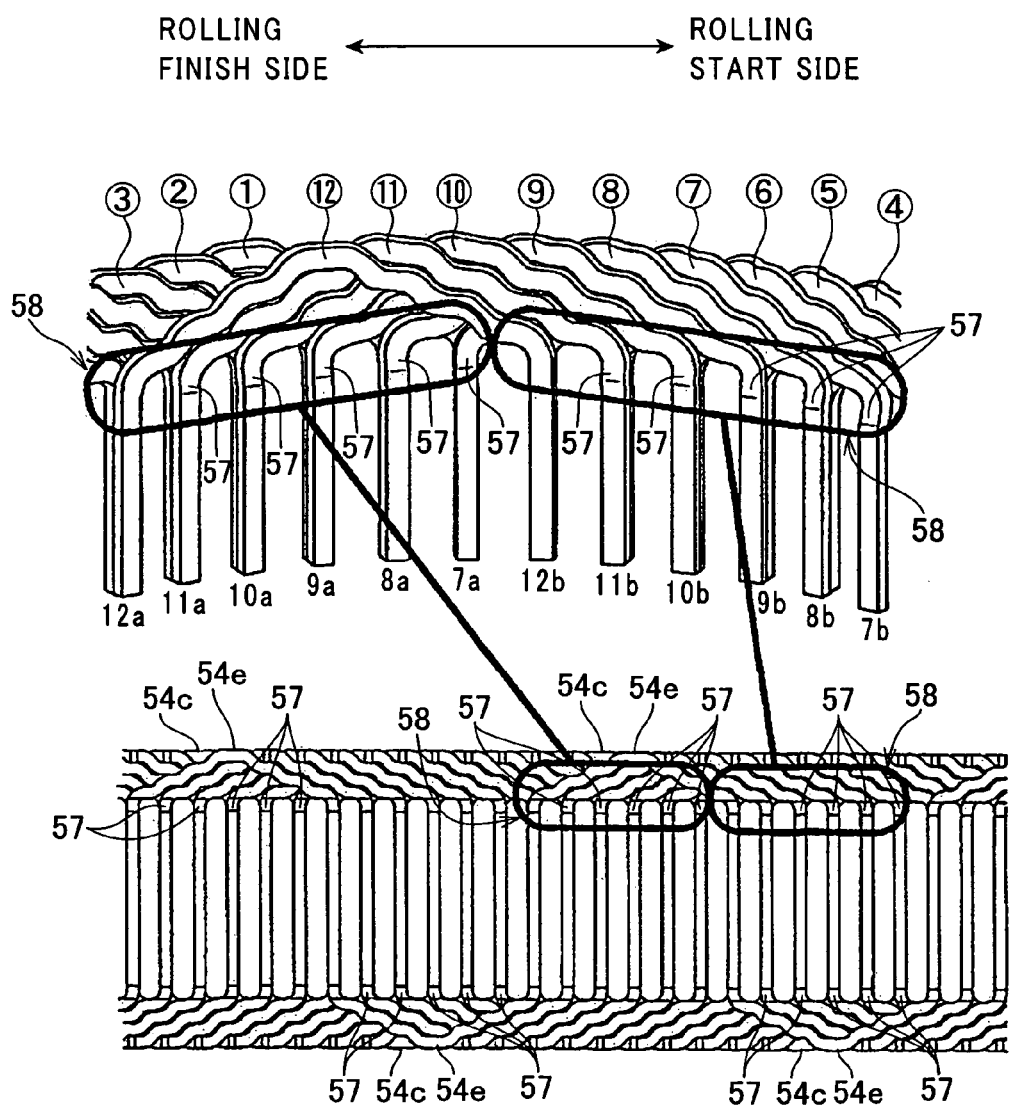
FIG. 11 is a schematic view illustrating, through enlargement, a portion of the electric wire assembly which makes up a portion of the second turn of the stator coil.

Furthermore, as illustrated in FIG. 11, in the second to sixth turns of the stator coil 40, there are formed only first radial position shift portion groups 58. Each of those first radial position shift portion groups 58 is composed of: either adjacent six of those radial position shift portions 57 of the No. 7-No. 12 electric wires which are provided at the rolling finish-side root parts of the corresponding turn portions 52; or adjacent six of those radial position shift portions 57 of the No. 7-No. 12 electric wires which are provided at the rolling start-side root parts of the corresponding turn portions 52. Moreover, in each of those first radial position shift portion groups 58, the amounts of radial position shift made by the radial position shift portions 57 decrease in the order of the No. 7, No. 8, . . . , and No. 12 electric wires. Those first radial position shift portion groups 58 are cyclically arranged from the second turn to the six turn of the stator coil 40.

In addition, the amounts of radial position shift made by the radial position shift portions 57 in each of the first and second radial position shift portion groups 58 and 59 can be suitably set so as to minimize irregularities of the radially inner and outer surfaces of the stator coil 40.

After the stator core 30 is assembled to the stator coil 40 which is formed with the above-described electric wires 50A-50C, each of the slots 31 of the stator core 30 receives the in-slot portions 51 of only two of the electric wires 50A-50C. As described previously, the amounts of radial position shift made by the radial position shift portions 57 are the same for the two electric wires. Moreover, in each of the slots 31, the in-slot portions 51 of one of the two electric wires are alternately arranged with those of the other electric wire in the radial direction of the stator core 30 (i.e., the depth-wise direction of the slot 31).

As described above, in the present embodiment, there are provided the radial position shift portions 57 in the No. 1 electric wire 50A and the No. 2-No. 5 and No. 7-No. 11 electric wires 50C. With the radial position shift portions 57, it is possible to prevent portions of the electric wires 50A-50C from protruding radially inward from the radially inner surface of the stator coil 40 or protruding radially outward from the radially outer surface of the stator coil 40. In other words, it is possible to make both the radially inner and outer surfaces of the stator coil 40 smooth and cylindrical.

Consequently, as shown in FIG. 19, the in-slot portions 51 of the electric wires 50A-50C can be reliably received in the corresponding slots 31 of the stator core 30 without protruding radially inward from the corresponding slots 51 and without forming void spaces at the bottoms of the corresponding slots 51. As a result, the space factors of the electric wires 50A-50C in the slots 31 of the stator core 30 can be maximized, thereby ensuring high performance of the stator 20.

In addition, in the present embodiment, each of the radial position shift portions 57 is bent radially outward. Consequently, the turn portions 52 of the electric wires 50A-50C can be reliably prevented from interfering with the rotor of the electric rotating machine which is to be disposed radially inside of the stator 20.

Figure 20:
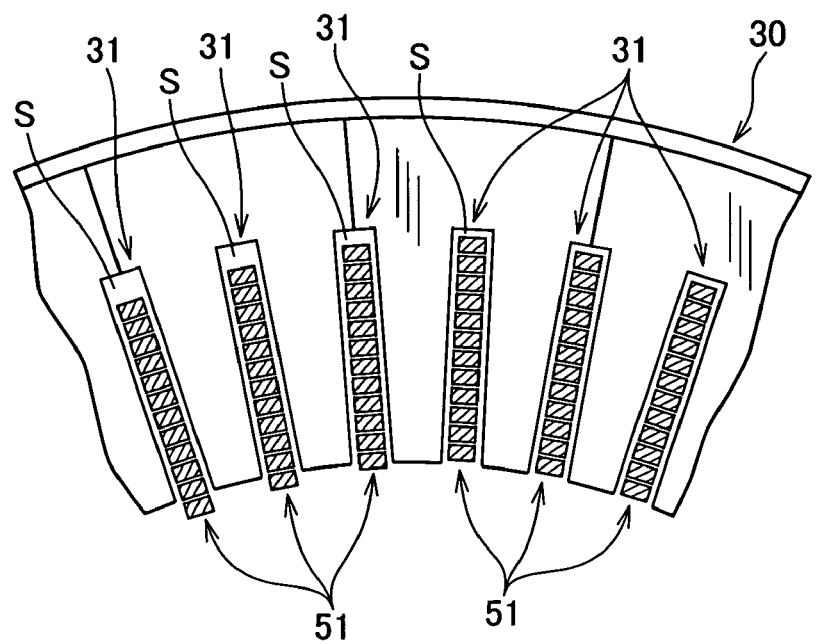
FIG. 20 is a schematic cross-sectional view illustrating low space factors of the electric wires in the slots which would be obtained according to an undesirable example.

In comparison, as shown in FIG. 20, without the radial position shift portions 57, some of the in-slot portions 51 of the electric wires 50A-50C would protrude radially inward from the corresponding slots 31 of the stator core 30, forming void spaces S at the bottoms of the corresponding slots 31. Consequently, the space factors of the electric wires 50A-50C in the slots 31 of the stator core 30 would be decreased, thereby lowering the performance of the stator 20. In addition, those in-slot portions 51 of the electric wires 50A-50C which protrude radially inward from the corresponding slots 31 of the stator core 30 could interfere with the rotor of the electric rotating machine, lowering the reliability of the stator 20.

Furthermore, in the present embodiment, each of the radial position shift portions 57 of the electric wires 50A-50C includes the straight part 57a, and the thickness d of the straight part 57a is set to be less than the radial thickness D of other portions of the electric wires 50A-50C.

Setting the thickness d of the straight part 57a as above, all the axial distances between the bend start positions of the radial position shift portions 57 and the corresponding axial end faces 32 of the stator core 30 can be made equal as shown in FIG. 21. Consequently, the protruding height H of the turn portions 52 of the electric wires 50A-50C from the corresponding axial end faces 32 of the stator core 30 can be minimized.

Figure 22A:
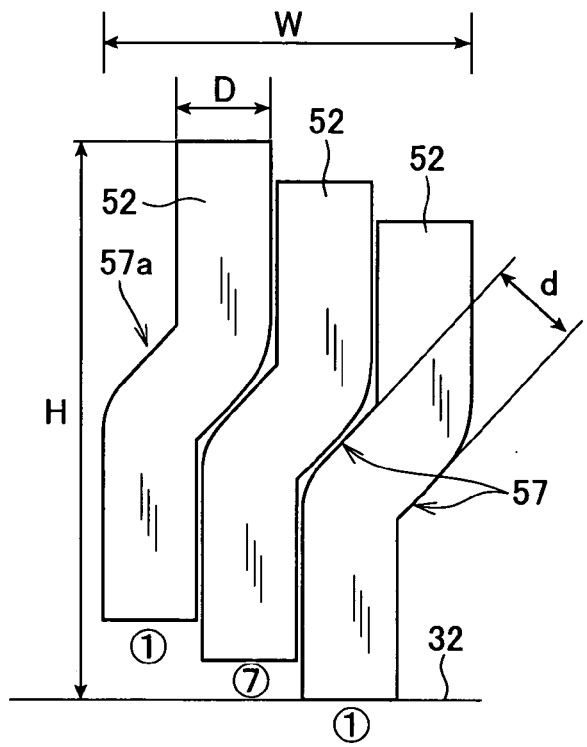
FIGS. 22A and 22B are schematic views illustrating the configurations of the radial position shift portions according to undesirable examples.
Figure 22B:
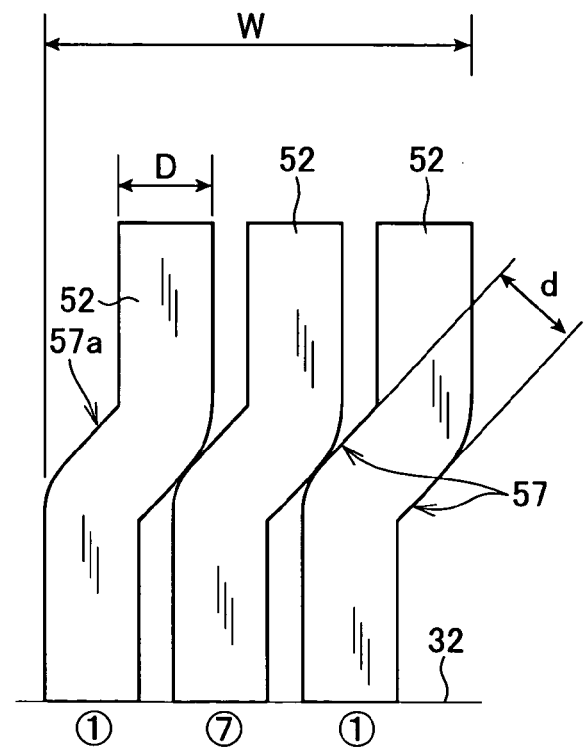

In comparison, as shown in FIG. 22A, if the thickness d were set to be equal to the thickness D, the axial distances between the bend start positions of the radial position shift portions 57 and the corresponding axial end faces 32 of the stator core 30 could not be made equal due to interference between the radial position shift portions 57. Consequently, the protruding height H of the turn portions 52 of the electric wires 50A-50C from the corresponding axial end faces 32 of the stator core 30 would be increased. In addition, with the thickness d equal to the thickness D, if the axial distances between the bend start positions of the radial position shift portions 57 and the corresponding axial end faces 32 of the stator core 30 were forcibly made equal, the radial position shift portions 57 would be displaced in the radial direction of the stator core 30, as shown in FIG. 22b, thereby increasing the radial width W of the coil ends of the stator coil 40.

Next, the further differences in configuration between the electric wires 50A-50C will be described.

In the present embodiment, each of the No. 2-No. 11 electric wires 50C includes a plurality of crank-shaped portions 54a. As shown in FIGS. 14 and 17A-17B, each of the crank-shaped portions 54a is provided at the center of the apex part 53 of one of the turn portions 52 of the electric wire 50C and is radially bent to shift the radial position of the electric wire 50C. It should be noted that the term "crank-shaped" is used here only for the purpose of describing the overall shape of the portions 54a and does not restrict the angles between adjacent sections of the portions 54a to 90'. In addition, since the crank-shaped portions 54a are provided in the apex parts 53 of the turn portions 52, they also extend parallel to the corresponding axial end faces 32 of the stator core 30.

In the present embodiment, the crank-shaped portions 54a are provided in all of the apex parts 53 of the turn portions 52 of the electric wires 50C. Further, the amount of radial position shift made by each of the crank-shaped portions 54a is set to be substantially equal to the radial thickness D of the electric wires 50C. Here, the amount of radial position shift made by each of the crank-shaped portions 54a is defined as the difference in radial position between the two circumferential ends of the apex part 53 respectively on opposite sides of the crank-shaped portion 54a.

Setting the amount of radial position shift made by each of the crank-shaped portions 54a as above, it is possible to arrange each radially-adjacent pair of the turn portions 52 of the electric wires 50C in intimate contact with each other. As a result, the radial width W of the coil ends of the stator coil 40 can be minimized, thereby preventing the stator coil 40 from radially protruding from the stator core 30.

Figure 18B:
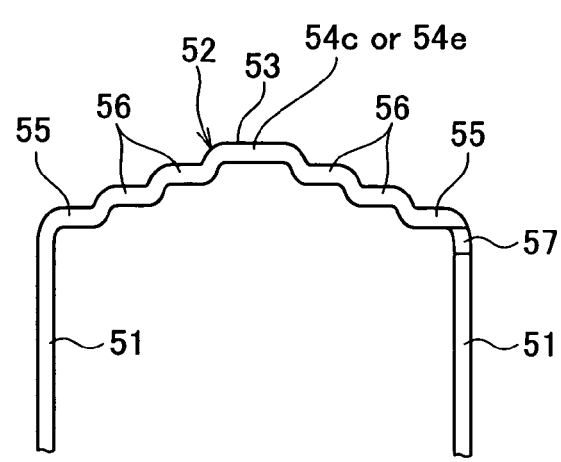

The No. 1 electric wire 50A includes six groups of crank-shaped portions. Each of the six groups includes two first crank-shaped portions 54b as shown in FIGS. 15A-15B and six second crank-shaped portions 54c as shown in FIGS. 18A-18B. The amount of radial position shift made by each of the first crank-shaped portions 54b is greater than that made by each of the second crank-shaped portions 54c.

In the present embodiment, as shown in FIG. 12, counting from the rolling start side (i.e., the right side in FIG. 12), the two first crank-shaped portions 54b of the first group are respectively provided at the centers of the apex parts 53 of the first and second turn portions 52, and the six second crank-shaped portions 54c of the first group are respectively provided at the centers of the apex parts 53 of the third to eighth turn portions 52. The second to sixth groups follow the first group, and the sequence of arrangement of the first and second crank-shaped portions 54b and 54c in each of the following five groups is the same as that in the first group.

As described previously, in the present embodiment, the stator coil 40 is formed by rolling the flat band-shaped electric wire assembly 60 shown in FIGS. 8-11 by six turns into the hollow cylindrical shape. Consequently, counting from the radially inner side of the stator coil 40, the first to sixth groups of the crank-shaped portions 54b and 54c are respectively provided in the first to sixth turns (or rounds) of the stator coil 40.

Further, in the present embodiment, the amount of radial position shift made by each of the first crank-shaped portions 54b of the electric wire 50A is set to be equal to that made by each of the crank-shaped portions 54a of the electric wires 50C. Moreover, the radial thickness D of the electric wire 50A is set to be equal to that of the electric wires 50C. Accordingly, the amount of radial position shift made by each of the first crank-shaped portions 54b is substantially equal to the radial thickness D of the electric wire 50A. On the other hand, the amount of radial position shift made by each of the second crank-shaped portions 54c of the electric wire 50A is set to zero. That is to say, in the present embodiment, the second crank-shaped portions 54c are actually reduced to straight portions 54c as shown in FIGS. 18A-18B. It should be noted that the amount of radial position shift made by each of the second crank-shaped portions 54c may also be set to be greater than zero.

The No. 12 electric wire 50B includes 42 third crank-shaped portions 54d as shown in FIGS. 16A-16B and six fourth crank-shaped portions 54e as shown in FIGS. 18A-18B. The amount of radial position shift made by each of the third crank-shaped portions 54d is greater than that made by each of the fourth crank-shaped portions 54e. In the present embodiment, as shown in FIG. 13, counting from the rolling start side (i.e., the right side in FIG. 13), the six fourth crank-shaped portions 54e are respectively provided at the centers of the apex parts 53 of the first to sixth turn portions 52, and the 42 third crank-shaped portions 54d are respectively provided at the centers of the apex parts 53 of the seventh to 48th turn portions 52.

Further, in the present embodiment, the amount of radial position shift made by each of the third crank-shaped portions 54d is set to be equal to that made by each of the crank-shaped portion 54a. Moreover, the radial thickness D of the electric wire 50B is set to be equal to that of the electric wires 50C. Accordingly, the amount of radial position shift made by each of the third crank-shaped portions 54d is substantially equal to the radial thickness D of the electric wire 50B. On the other hand, the amount of radial position shift made by each of the fourth crank-shaped portions 54e is set to zero. That is to say, in the present embodiment, the fourth crank-shaped portions 54e are actually reduced to straight portions 54e as shown in FIGS. 18A-18B. It should be noted that the amount of radial position shift made by each of the fourth crank-shaped portions 54e may also be set to be greater than zero.

In the stator 20, which is obtained by assembling the stator core 30 to the stator coil 40 that is formed with the above-described electric wires 50A-50C, the crank-shaped portions (or straight portions) 54c of the No. 1 electric wire 50A and the crank-shaped (or straight portions) 54e of the No. 12 electric wire 50B are circumferentially located at three places on each axial side of the stator core 30.

Specifically, on one axial side of the stator core 30, as shown in FIG. 1, the crank-shaped portions 54c (hatched in FIG. 1) of the No. 1 electric wire 50A are circumferentially located at three places which respectively correspond to the circumferential spaces between the No. 21 and No. 23 slots 31, between the No. 33 and NO. 35 slots 31, and between the No. 45 and No. 47 slots 31 of the stator core 30. Further, at each of the three places, there are six crank-shaped portions 54c aligned in the radial direction of the stator core 30.

Figure 2:
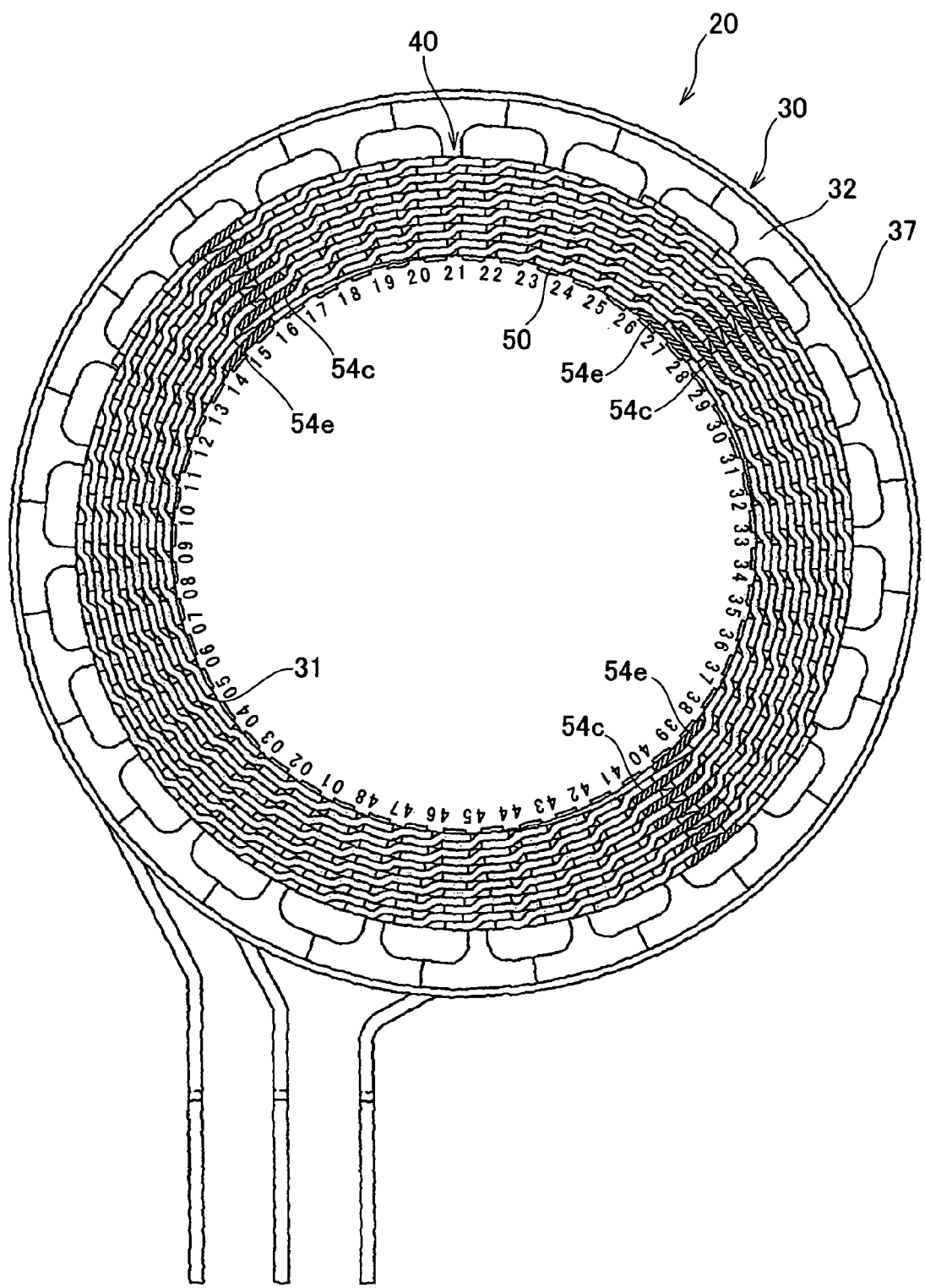
FIG. 2 is a bottom view of the stator.
Figure 3:
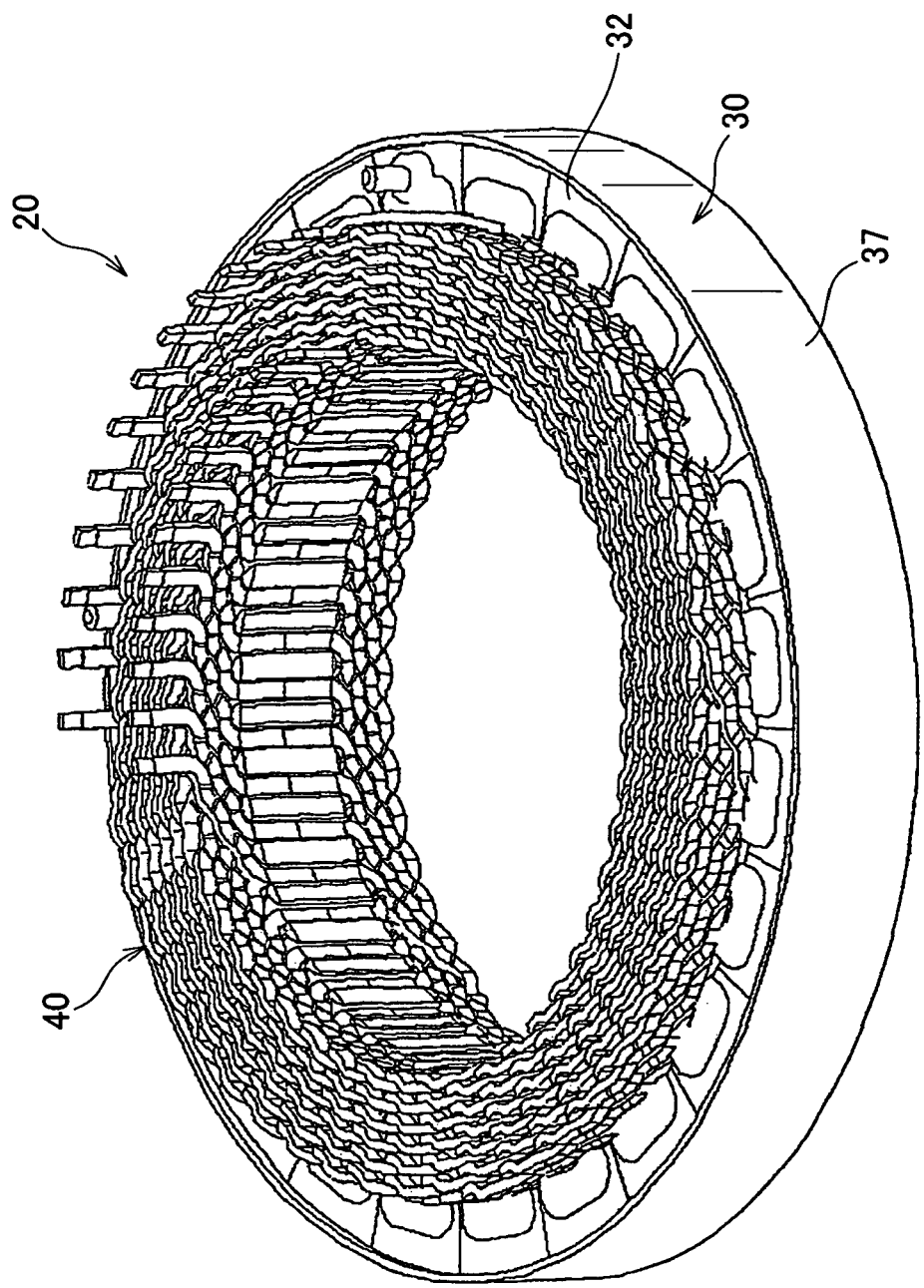
FIG. 3 is a perspective view of the stator.
Figure 4:
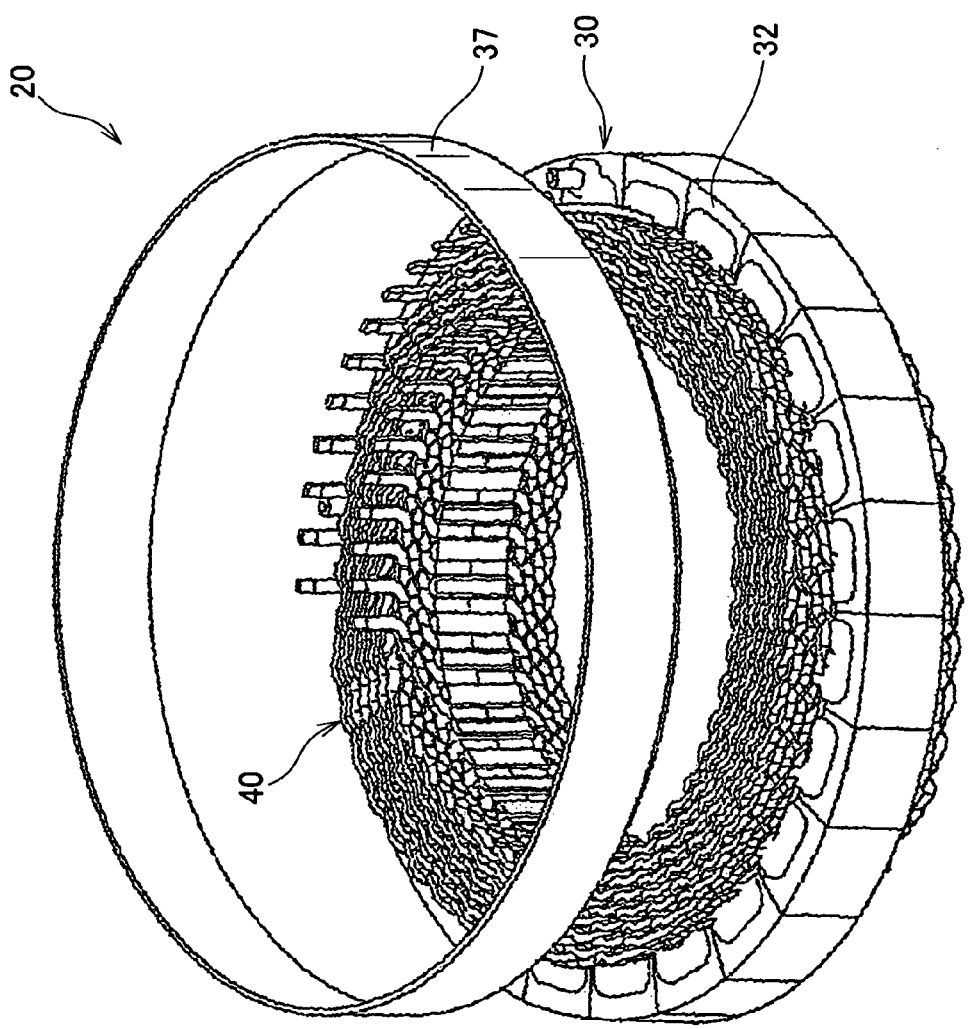
FIG. 4 is a perspective view showing the stator without an outer rim of a stator core of the stator.

On the other axial side of the stator core 30, as shown in FIG. 2, the crank-shaped portions 54c (hatched in FIG. 2) of the No. 1 electric wire 50A are circumferentially located at three places which respectively correspond to the circumferential spaces between the No. 15 and No. 17 slots 31, between the No. 27 and NO. 29 slots 31, and between the No. 39 and No. 41 slots 31 of the stator core 30. Further, at each of the three places, there are six crank-shaped portions 54c aligned in the radial direction of the stator core 30.

With the crank-shaped portions 54c (or straight portions 54c in the present embodiment) of the No. 1 electric wire 50A, it is possible to keep the coil ends of the stator coil 40 from protruding radially outward at the six places where the crank-shaped portions 54c are located. Moreover, with the crank-shaped portions 54b of the No. 1 electric wire 50A, the transitions of the No. 1 electric wire 50A between different turns of the stator coil 40 can be made smoothly without increasing the radial width W of the coil ends of the stator coil 40.

Moreover, on one axial side of the stator core 30, as shown in FIG. 1, the crank-shaped portions 54e (hatched in FIG. 1) of the No. 12 electric wire 50B are circumferentially located at three places which respectively correspond to the circumferential spaces between the No. 20 and No. 22 slots 31, between the No. 32 and NO. 34 slots 31, and between the No. 44 and No. 46 slots 31 of the stator core 30. Further, at each of the three places, there is only one crank-shaped portion 54e located on the radially inner surface of the stator coil 40 (or in the innermost turn of the stator coil 40).

On the other axial side of the stator core 80, as shown in FIG. 2, the crank-shaped portions 54e (hatched in FIG. 2) of the No. 12 electric wire 50B are circumferentially located at three places which respectively correspond to the circumferential spaces between the No. 14 and No. 16 slots 31, between the No. 26 and NO. 28 slots 31, and between the No. 38 and No. 40 slots 31 of the stator core 30. Further, at each of the three places, there is only one crank-shaped portion 54e located on the radially inner surface of the stator coil 40 (or in the innermost turn of the stator coil 40).

Figure 24:
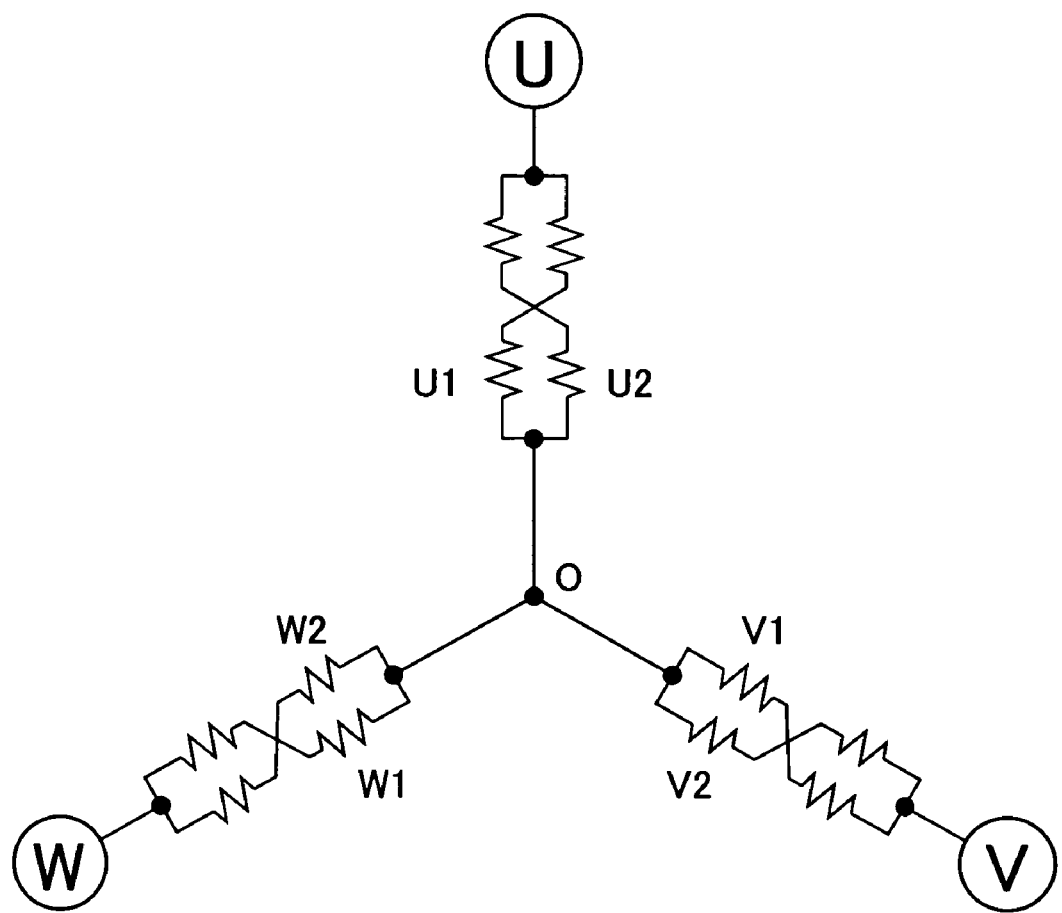
FIG. 24 is a schematic circuit diagram of the stator according to the first embodiment.

With the crank-shaped portions 54e (or straight portions 54e in the present embodiment) of the No. 12 electric wire 50B, it is possible to keep the coil ends of the stator coil 40 from protruding radially inward at the six places where the crank-shaped portions 54e are located. As a result, it is possible to prevent the stator coil 40 from interfering with the rotor of the electric rotating machine which is to be disposed radially inside of the stator 20. Referring now to FIG. 24, in the present embodiment, the stator coil 40 is made up of six phase windings U1, U2, V1, V2, W1, and W2. The phase windings U1 and U2 are connected in parallel with each other to make up a U-phase winding of the stator coil 40. Similarly, the phase windings V1 and V2 are connected in parallel with each other to make up a V-phase winding of the stator coil 40. The phase windings W1 and W2 are connected in parallel with each other to make up a W-phase winding of the stator coil 40. Further, the U-phase, V-phase, and W-phase windings are Y-connected to have a neutral point O therebetween.

Moreover, in the present embodiment, each of the six phase windings U1, U2, V1, V2, W1, and W2 of the stator coil 40 is formed by joining a pair of the electric wires 50A-50C by, for example, welding. In other words, each of the six phase windings U1, U2, V1, V2, W1, and W2 is composed of two of the twelve electric wires 50A-50C.

In the stator 20, each of the twelve electric wires 50A-50C is wave-wound around the stator core 30 so as to extend in the circumferential direction of the stator core 30. In the present embodiment, the slots 31 of the stator core 30 are divided into eight groups each of which includes six circumferentially-adjacent slots 31. For each of the electric wires 50A-50C, all of the in-slot portions 51 of the electric wire are received in eight slots 31 that belong respectively to the eight groups and are spaced six slots 31 apart in the circumferential direction of the stator core 30. Further, for each of the electric wires 50A-50C, each of the turn portions 52 of the electric wire protrudes from one of the axial end faces 32 of the stator core 30 to connect one circumferentially-adjacent pair of the in-slot portions 51 of the electric wire. Consequently, all of the turn portions 52 of the electric wires 50 are located outside of the slots 31 of the stator core 30 to make up the coil ends of the stator coil 40.

Furthermore, for each of the electric wires 50A-50C, one end of the electric wire protrudes from a radially outmost part of one of the slots 31 of the stator core 30; the other end of the electric wire protrudes from a radially innermost part of another one of the slots 31 of the stator core 30. Further, both the ends of the electric wire protrude from the same axial end face 32 of the stator core 30. Each of the slots 31 of the stator core 30 receives the in-slot portions 51 of only two of the electric wires 50A-50C. Further, in each of the slots 31, the in-slot portions 51 of one of the two electric wires are alternately arranged with those of the other electric wire in the depth-wise direction of the slot 31.

After having described the overall configuration of the stator 20 according to the present embodiment, the advantages thereof will be described hereinafter.

In the present embodiment, the stator 20 includes the hollow cylindrical stator core 30 and the stator coil 40. The stator core 30 has the slots 31 that are formed in the radially inner surface of the stator core 30 and spaced at predetermined intervals in the circumferential direction of the stator core 30. The stator coil 40 is made up of the twelve wave-shaped electric wires 50A-50C mounted on the stator core 30. Each of the electric wires 50A-50C has the in-slot portions 51, each of which is received in one of the slots 31 of the stator core 30, and the turn portions 52 each of which is located outside of the slots 31 of the stator core 30 to connect one adjacent pair of the in-slot portions 51 of the electric wire. Each of the turn portions 52 includes the apex part 53 that is located axially furthest in the turn portion 52 from the stator core 30. Furthermore, the electric wires 50A-50C include a plurality of radial position shift portions 57 each of which is provided, in one of the electric wires 50A-50C, in one of the turn portions 52 of the electric wire between the apex part 53 of the turn portion 52 and one of the in-slot portions 51 of the electric wire adjoining the turn portion 52 and is radially bent to shift the radial position of the electric wire.

With the radial position shift portions 57, it is possible to prevent interference between the turn portions 52 of the electric wires 50A-50C, thereby preventing portions of the electric wires 50A-50C from protruding radially inward from the radially inner surface of the stator coil 40 or protruding radially outward from the radially outer surface of the stator coil 40. In other words, it is possible to make both the radially inner and outer surfaces of the stator coil 40 smooth and cylindrical. Consequently, the in-slot portions 51 of the electric wires 50A-50C can be reliably received in the corresponding slots 31 of the stator core 30 without protruding radially inward from the corresponding slots 51 and without forming void spaces at the bottoms of the corresponding slots 51. As a result, the space factors of the electric wires 50A-50C in the slots 31 of the stator core 30 can be maximized, thereby ensuring high performance of the stator 20.

It should be noted that each of the radial position shift portions 57 can be provided in any one of the turn portions 52 of the electric wires 50A-50C and anywhere between the apex part 53 of the turn portion 52 and either of the in-slot portions 51 adjoining the turn portion 52. It should also be noted that the radial position shift portions 57 are not necessarily provided in all of the turn portions 52 of the electric wires 50A-50C.

In the present embodiment, each of the radial position shift portions 57 is bent radially outward from an end of the in-slot portion 51 which adjoins the turn portion 52.

Consequently, the radial positions of the turn portions 52 where the radial position shift portions 57 are provided can be shifted radially outward. As a result, the turn portions 52 can be reliably prevented from interfering with the rotor of the electric rotating machine which is to be disposed radially inside of the stator 20.

Moreover, the outer diameter of the stator coil 40 in the axial range where the in-slot portions 51 of the electric wires 50A-50C are stacked can be reduced by the maximum value of the amounts of radial position shift made by the radial position shift portions 57. As a result, the outer diameter of the stator core 30 can be accordingly reduced, thereby making it possible to downsize the stator 20.

In the present embodiment, all of the radial position shift portions 57 of the electric wires 50A-50C can be divided into six types according to the amounts of radial position shift made by the radial position shift portions 57. More specifically, the radial position shift portions 57 of the No. 1 electric wire 50A are of the same type as those of No. 7 electric wire 50C; the radial position shift portions 57 of the No. 2 electric wire 50C are of the same type as those of the No. 8 electric wire 50C; the radial position shift portions 57 of the No. 3 electric wire 50C are of the same type as those of the No. 9 electric wire 50C; the radial position shift portions 57 of the No. 4 electric wire 50C are of the same type as those of the No. 10 electric wire 50C; the radial position shift portions 57 of the No. 5 electric wire 50C are of the same type as those of the No. 11 electric wire 50C. It should be noted that each of the No. 1-No. 12 electric wires may also be modified to have different types of the radial position shift portions 57. In addition, both the No. 6 electric wire 50C and the No. 12 electric wire 50B include no radial position shift portion 57; however, both of them can be considered as including radial position shift portions 57 the amounts of radial position shift made by which are set to zero.

With the different types of the radial position shift portions 57, it is possible to more easily make both the radially inner and outer surfaces of the stator coil 40 smooth and cylindrical. Consequently, the in-slot portions 51 of the electric wires 50A-50C can be more reliably received in the corresponding slots 31 of the stator core 30, thereby further improving the space factors of the electric wires 50A-50C in the slots 31 of the stator core 30.

In the present embodiment, all of the radial position shift portions 57 of the electric wires 50A-50C are so arranged that the amounts of radial position shift made by the radial position shift portions 57 vary in the circumferential direction of the stator core 30. More specifically, in the present embodiment, the amounts of radial position shift made by the radial position shift portions 57 decrease in the order of the pair of No. 1 and No. 7 electric wires 50A and 50C, the pair of No. 2 and No. 8 electric wires 50C, the pair of No. 3 and No. 9 electric wires 50C, the pair of No. 4 and No. 10 electric wires 50C, and the pair of No. 5 and No. 11 electric wires 50C.

In the stator coil 40, which is formed by rolling the flat band-shaped electric wire assembly 60 by six turns into the hollow cylindrical shape, the radial positions of the inner and outer surfaces of the stator coil 40 vary in the circumferential direction of the stator core 30. Therefore, by varying the amounts of radial position shift made by the radial position shift portions 57 in the circumferential direction to offset the variations in radial position of the inner and outer surfaces of the stator coil 40, it is possible to make both the inner and outer surfaces of the stator coil 40 smooth and cylindrical.

In the present embodiment, the radial position shift portions 57 of the electric wires 50-50C form the first radial position shift portion groups 58 in each of which the amounts of radial position shift made by the radial position shift portions 57 vary in the circumferential direction of the stator core 30. Further, the first radial position shift portion groups 58 are cyclically arranged in the circumferential direction of the stator core 30.

In the stator coil 40, the radial positions of the inner and outer surfaces of the stator coil 40 cyclically vary in the circumferential direction of the stator core 30. Therefore, by cyclically arranging the first radial position shift portion groups 58 in the circumferential direction to offset the variations in radial position of the inner and outer surfaces of the stator coil 40, it is possible to easily and reliably make both the inner and outer surfaces of the stator coil 40 smooth and cylindrical.

In the present embodiment, the electric rotating machine is 3-phase, 8-pole AC machine, and the total number of the slats 31 provided in the stator core 30 is equal to 48 (i.e., 8×3×2). Further, each pair of the in-slot portions 51 connected by one of the turn portions 52 of the electric wires 50A-50C are respectively received in a pair of the slots 31 of the stator core 30 which are spaced six (i.e., 3×2) slots apart in the circumferential direction of the stator core 30. In this case, the radial positions of the inner and outer surfaces of the stator coil 40 vary in the circumferential direction of the stator core 30 in a six-slot cycle. However, in the present embodiment, the first radial position shift portion groups 58 are also arranged in the circumferential direction of the stator core 30 in a six-slot cycle. Therefore, by making the cycle of the arrangement of the first radial position shift portion groups 58 coincident with that of the variations in radial position of the inner and outer surfaces of the stator coil 40, it is possible to more easily and reliably make both the inner and outer surfaces of the stator coil 40 smooth and cylindrical.

In the present embodiment, the radial position shift portions 57 of the electric wires 50A-50C also form the second radial position shift portion groups 59. In each of the groups 59, the amounts of radial position shift made by the radial position shift portions 57 are set to a constant value, more particularly to zero in the present embodiment. Further, in the first turn (i.e., the radially innermost turn) of the stator coil 40, the first radial position shift portion groups 58 are alternately arranged with the second radial position shift portion groups 59 in the circumferential direction of the stator core 30.

With the alternate arrangement of the first and second radial position shift portion groups 58 and 59, it is possible to prevent the turn portions 52 of the electric wires 50A-50C in the first turn of the stator coil 40 from protruding radially inward, thereby preventing interference between the turn portions 52 and the rotor of the electric rotating machine which is to be disposed radially inside of the stator 20.

In the present embodiment, each of the radial position shift portions 57 of the electric wires 50A-50C is substantially crank-shaped to include the straight part 57a at the center thereof and the pair of first and second bent parts 57b respectively on opposite sides of the straight part 57a.

With the above configuration, during the shaping of each of the radial position shift portions 57, it is possible to absorb the dimensional tolerances of the first and second bent parts 57b with the straight part 57a. Consequently, each of the radial position shift portions 57 can be easily and accurately shaped.

In the present embodiment, each of the radial position shift portions 57 is provided at a root part of one of the turn portions 52 of the electric wires 50A-50C.

With the above location of the radial position shift portions 57, it is possible to easily obtain a compact and stable shape of the turn portions 52.

In the present embodiment, among the No. 1-No. 12 electric wires 50A-50C, both the No. 6 electric wire 50C and No. 12 electric wire 503 have no radial position shift portion 57 formed therein.

Consequently, the number of the electric wires having the radial position shift portions 57 in the stator coil 40 is reduced, thereby reducing the manufacturing cost of the stator coil 40. In addition, it is also possible to modify both the No. 5 and No. 11 electric wires 50C to have no radial position shift portion 57 formed therein.

In the present embodiment, each of the turn portions 52 of the electric wires 50A-50C is stepped to include the plurality of shoulder parts 55 and 56 that extend parallel to the corresponding axial end face 32 of the stator core 30 from which the turn portion 52 protrudes.

With the shoulder parts 55 and 56, the protruding height H of each of the turn portions 52 from the corresponding axial end face 32 of the stator core 30 can be reduced. As a result, the axial length of coil ends of the stator coil 40 can be reduced.

In the present embodiment, all the axial distances between the bend start positions of the radial position shift portions 57 and the corresponding axial end faces 32 of the stator core 30 are equal. Consequently, the protruding height H of the turn portions 52 of the electric wires 50A-50C from the corresponding axial end faces 32 of the stator core 30 can be minimized. As a result, the axial length of coil ends of the stator coil 40 can be minimized.

In the present embodiment, for each of the radial position shift portions 57 of the electric wires 50A-50C, the thickness d of the straight part 57a on the reference plane 101 is set to be less than the radial thickness D of other portions of the electric wire.

Setting the thickness d of the straight part 57a as above, all the axial distances between the bend start positions of the radial position shift portions 57 and the corresponding axial end faces 32 of the stator core 30 can be made equal without interference between radially-adjacent pairs of the radial position shift portions 57. As a result, the axial length of coil ends of the stator coil 40 can be minimized without increasing the radial width of the same.

In addition, instead of setting the thickness d of the straight part 57a, it is also possible to set the cross-sectional area of the straight part 57a, which is perpendicular to the extending direction of the electric wire, to be less than that of other portions of the electric wire. Setting the cross-sectional area of the straight part 57a as above, it is possible to achieve the same effects as setting the thickness d of the straight part 57a.

In the present embodiment, each of the electric wires 50A-50C is made up of the electric conductor 67 having the rectangular cross section and the insulating coat 68 covering the surface of the electric conductor 67. With the rectangular cross section, it is possible to densely arrange the in-slot portions 51 of the electric wires 50A-50C in the slots 31 of the stator core 30, thereby improving the space factors of the electric wires 50A-50C in the slots 31. Moreover, it is also possible to densely and regularly arrange the turn portions 52 of the electric wires 50A-50C outside of the slots 31 of the stator core 30, thereby reducing both the axial length and radial width of the coil ends of the stator coil 40.

Further, in the present embodiment, the insulating coat 68 is two-layer structured to include the inner layer 68a and the outer layer 68b. With the two-layer structure, it is possible to reliably insulate the electric wires 50A-50C from one another without interposing insulating paper sheets therebetween.

In the present embodiment, the stator coil 40 is formed by rolling the flat band-shaped electric wire assembly 60 by six turns into the hollow cylindrical shape. The flat band-shaped electric wire assembly 60 is formed by stacking the twelve electric wires 50A-50C.

With the above formation of the electric wire assembly 60, it is possible to significantly reduce the manufacturing cost of the stator coil 40 in comparison with the case of forming the electric wire assembly 60 by interlacing the electric wires 30A-50C. Moreover, since the stator coil 40 is formed with the single electric wire assembly 60, it is possible to reduce the number of joining portions in comparison with the case of forming the stator coil 40 by joining a plurality of electric wire assemblies.

Second Embodiment

This embodiment illustrates a configuration of the radial position shift portions 57 of the electric wires 50A-50C, which is different from that according to the first embodiment.

As described previously, in the first embodiment, each of all the radial position shift portions 57 is provided at a root part of one of the turn portions 52 and bent radially outward from an end of one of the in-slot portions 51 which adjoins the turn portion 52.

In comparison, in the present embodiment, all of the radial position shift portions 57 are divided into first and second types. Each of the first-type radial position shift portions 57 is bent radially outward from the end of the in-slot portion 51 as in the first embodiment, whereas each of the second-type radial position shift portions 57 is bent radially inward from the end of the in-slot portion 51.

Further, in the present embodiment, the bending directions and the amounts of radial position shift are set the same for the radial position shift portions 57 of each of the electric wire pairs received in the same slots 31 of the stator core 30. As in the first embodiment, those electric wire pairs include the pair of No. 1 and No. 7 electric wires 50A and 50C, the pair of No. 2 and No. 8 electric wires 50C, the pair of No. 3 and No. 9 electric wires 50C, the pair of No. 4 and No. 10 electric wires 50C, the pair of No. 5 and No. 11 electric wires 50C, and the pair of No. 6 and No. 12 electric wires 50C and 50B. In addition, for each of the No. 1-No. 12 electric wires 50A-50C, the radial position shift portions 57 located in the first turn (i.e., the radially innermost turn) of the stator coil 40 are made different from those located in the second to sixth turns.

First, the radial position shift portions 57 of the electric wires 50A-50C in the first turn of the stator coil 40 will be described with reference to FIG. 25.

Figure 25:
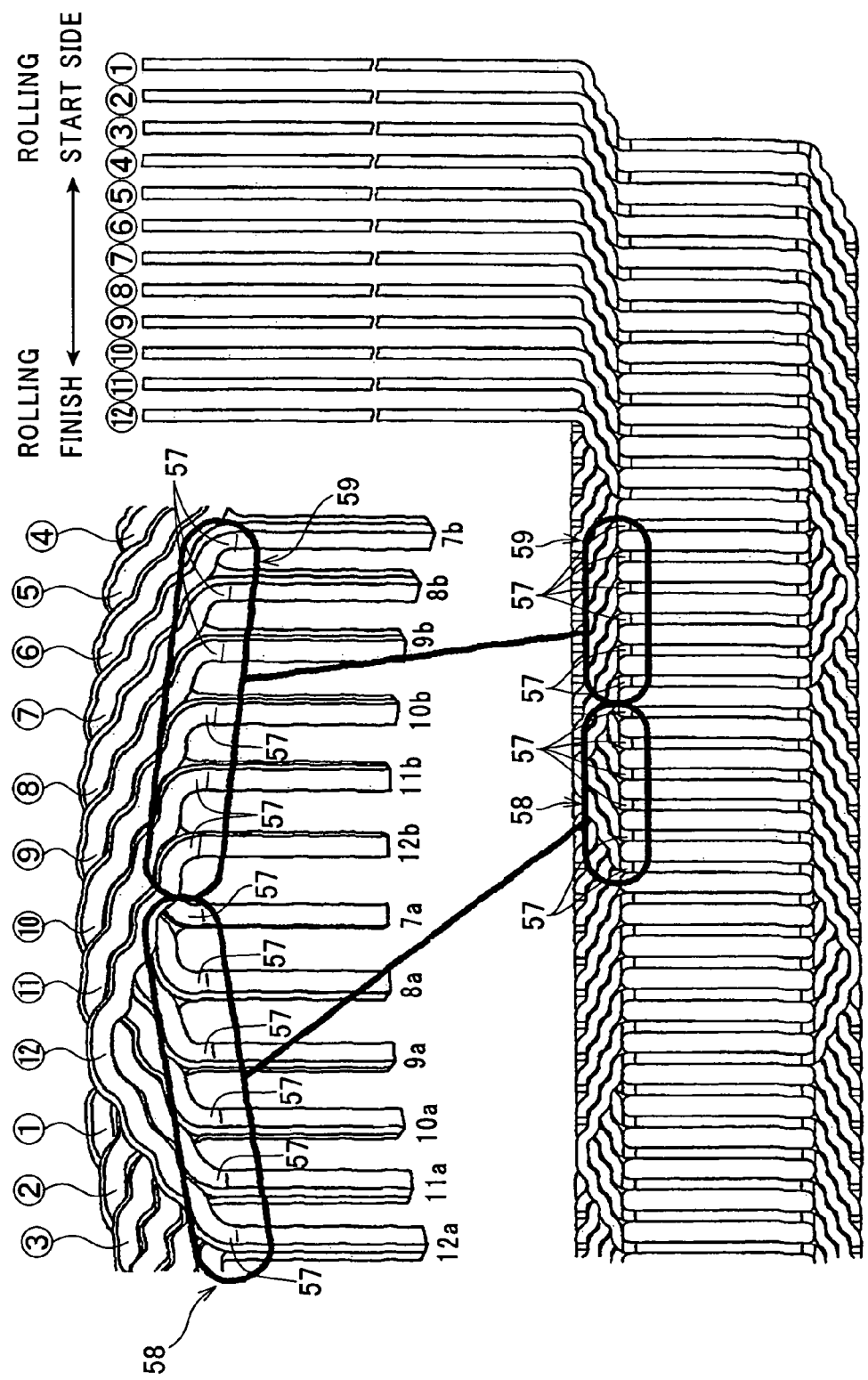
FIG. 25 is a schematic view illustrating, through enlargement, a portion of an electric wire assembly, which makes up a portion of the first turn of a stator coil according to the second embodiment of the invention.
Figure 26:
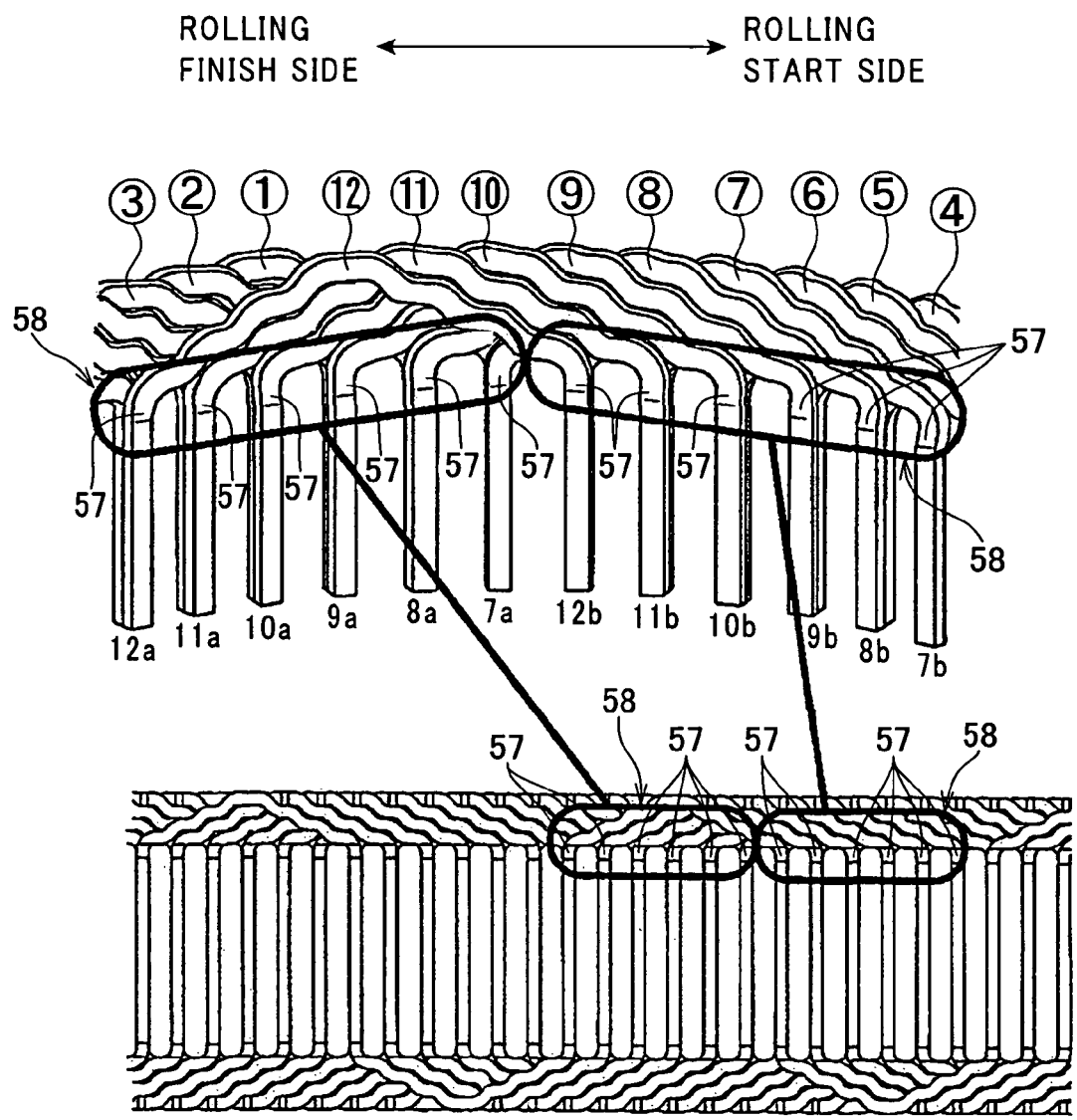
FIG. 26 is a schematic view illustrating, through enlargement, a portion of the electric wire assembly which makes up a portion of the second turn of the stator coil according to the second embodiment.

In addition, for the sake of convenience of explanation, in FIG. 25 and subsequent FIG. 26, the rolling start-side (i.e., the right-side in FIGS. 25 and 26) root parts of the turn portions 52 of the No. 1-No. 12 electric wires 50A-50C are indicated by the respective numbers of the electric wires 50A-50C with the letter "b" suffixed thereto; the rolling finish-side (i.e., the left-side in FIGS. 25 and 26) root parts of the turn portions 52 of the No. 1-No. 12 electric wires 50A-50C are indicated by the respective numbers of the electric wires 50A-50C with the letter "a" suffixed thereto.

Moreover, in the present embodiment, the sum of absolute values of the amount of radial position shift made by each of those radial position shift portions 57 of the electric wires 50A-50C which are maximally bent radially outward and the amount of radial position shift made by each of those radial position shift portions 57 of the electric wires 50A-50C which are maximally bent radially inward is set to be equal to the radial thickness D of the electric wires 50A-50C. Further, the amount of radial position shift made by each of the radial position shift portions 57 of the electric wires 50A-50C is represented by a relative value to the radial thickness D of the electric wires 50A-50C. In addition, for the radial position shift portions 57, the radially-outward bending direction is indicated by the positive sign "+", whereas the radially-inward bending direction is indicted by the negative sign "−".

As shown in FIG. 25, on the first layer (i.e., the radially inner layer) of the first turn the radially innermost turn) of the stator coil 40, each of the radial position shift portions 57 provided at the root parts 12a of the No. 12 electric wire 50B is bent radially inward to shift the radial position of the No. 12 electric wire 50B by (−0.3). Each of the radial position shift portions 57 provided at the root parts 11a of the No. 11 electric wire 50C is bent radially inward to shift the radial position of the No. 11 electric wire 50C by (−0.1). Each of the radial position shift portions 57 provided at the root parts 10a, of the No. 10 electric wire 50C is bent radially outward to shift the radial position of the No. 10 electric wire 50C by (+0.1). Each of the radial position shift portions 57 provided at the root parts 9a of the No. 9 electric wire 50C is bent radially outward to shift the radial position of the No. 9 electric wire 50C by (+0.3). Each of the radial position shift portions 57 provided at the root parts 8a of the No. 8 electric wire 50C is bent radially outward to shift the radial position of the No. 8 electric wire 50C by (+0.5). Each of the radial position shift portions 57 provided at the root parts 7a of the No. 7 electric wire 50C is bent radially outward to shift the radial position of the No. 7 electric wire 50C by (+0.7). Consequently, on the first layer of the first turn of the stator coil 40, there are formed first radial position shift portion groups 58 each of which is composed of six adjacent radial position shift portions 57 that are respectively provided at six adjacent root parts 7a-12a of the No. 7-No. 12 electric wires. In each of the first radial position shift portion groups 58, the amounts of radial position shift made by the radial position shift portions 57 decrease in the order of the root parts 7a, 8a, . . . , and 12a.

Moreover, on the first layer of the first turn of the stator coil 40, all of the radial position shift portions 57 provided at the root parts 7b, 8b, 9b, 101, 11b, and 12b of the No. 7-No. 12 electric wires 50C and 50B are bent radially inward to shift the radial positions of the respective electric wires 50C and 5013 by (−0.3). Consequently, on the first layer of the first turn of the stator coil 40, there are also formed second radial position shift portion groups 59 each of which is composed of six adjacent radial position shift portions 57 that are respectively provided at six adjacent root parts 7b-12b of the No. 7-No. 12 electric wires. In each of the second radial position shift portion groups 59, the amounts of radial position shift made by the radial position shift portions 57 are set to a constant value, more particularly to a relative value of (−0.3) in the present embodiment. Further, on each axial side of the stator core 30, the first radial position shift portion groups 58 are alternately arranged with the second radial position shift portion groups 59 in the circumferential direction of the stator core 30.

Accordingly, in the present embodiment, on the first layer of the first turn of the stator coil 40, there is satisfied the following relationship between the amounts of radial position shift made by the radial position shift portions 57 of the No. 7-No. 12 electric wires: 7b=8b=9b=10b=11b=12b=12a<11a<10a<9a<8a<7a. Further, the sum of absolute values of (+0.7) and (−0.3) is equal to 1. In other words, the sum of absolute values of the amount of radial position shift made by each of those radial position shift portions 57 which are provided at the root parts 7a and maximally bent radially outward and the amount of radial position shift made by each of those radial position shift portions 57 which are provided at the root parts 7b-12b and 12a and maximally bent radially inward is equal to the radial thickness D of the electric wires 50A-50C.

In addition, in the present embodiment, the bending directions of the radial position shift portions 57 of the No. 7-No. 12 electric wires are changed between the root parts 10a and 11a; the ratio between the maximum amount of radially-outward position shift and the maximum amount of radially-inward position shift made by the radial position shift portions 57 of the No. 7-No. 11 electric wires is set to (0.7:0.3). However, the bending directions may also be changed between other root parts with the ratio set to other values. For example, the bending directions may also be changed between the root parts 9a and 10a with the ratio set to (0.5: 0.5).

Furthermore, on the second layer (i.e., the radially outer layer) of the first turn of the stator coil 40, there are formed only first radial position shift portion groups 58. Each of those first radial position shift portion groups 58 is composed of either six adjacent radial position shift portions 57 that are respectively provided at six adjacent root parts 1a-6a of the No. 1-No. 6 electric wires; or six adjacent radial position shift portions 57 that are respectively provided at six adjacent root parts 1b-6b of the No. 1-No. 6 electric wires. Further, there is satisfied the following relationship between the amounts of radial position shift made by the radial position shift portions 57 of the No. 1-No. 6 electric wires: 6a=6b<5a=5b<4a=4b<3a=3b<2a=2b<1a=1b. On each axial side of the stator core 30, the first radial position shift portion groups 58 are cyclically arranged in the circumferential direction of the stator core 30.

Next, the radial position shift portions 57 of the electric wires 50A-50C in the second turn of the stator coil 40 will be described with reference to FIG. 26.

As shown in FIG. 26, on the first layer (i.e., the radially inner layer) of the second turn of the stator coil 40, each of the radial position shift portions 57 provided at the root parts 12a of the No. 12 electric wire 508 is bent radially inward to shift the radial position of the No. 12 electric wire 505 by (−0.3). Each of the radial position shift portions 57 provided at the root parts 11a of the No. 11 electric wire 50C is bent radially inward to shift the radial position of the No. 11 electric wire 50C by (−0.1). Each of the radial position shift portions 57 provided at the root parts 10a of the No. 10 electric wire 50C is bent radially outward to shift the radial position of the No. 10 electric wire 50C by (+0.1). Each of the radial position shift portions 57 provided at the root parts 9a of the No. 9 electric wire 50C is bent radially outward to shift the radial position of the No. 9 electric wire 50C by (+0.3). Each of the radial position shift portions 57 provided at the root parts 8a of the No. 8 electric wire 50C is bent radially outward to shift the radial position of the No. 8 electric wire 50C by (+0.5). Each of the radial position shift portions 57 provided at the root parts 7a of the No. 7 electric wire 50C is bent radially outward to shift the radial position of the No. 7 electric wire 50C by (+0.7). Consequently, on the first layer of the second turn of the stator coil 40, there are formed first radial position shift portion groups 58 each of which is composed of six adjacent radial position shift portions 57 that are respectively provided at six adjacent root parts 7a-12a of the No. 7-No. 12 electric wires. In each of the first radial position shift portion groups 58, the amounts of radial position shift made by the radial position shift portions 57 decrease in the order of the root parts 7a, 8a, . . . , and 12a.

Accordingly, the first radial position shift portion groups 58 consisting of the radial position shift portions 57 provided at the root parts 7a-12a of the No. 7-No. 12 electric wires on the first layer of the second turn of the stator coil 40 are identical to those on the first layer of the first turn of the stator coil 40.

Moreover, on the first layer of the second turn of the stator coil 40, the bending direction and the amount of radial position shift set for the radial position shift portions 57 provided at the root parts 12b of the No. 12 electric wire are the same as those set for the radial position shift portions 57 provided at the root parts 12a. The bending direction and the amount of radial position shift set for the radial position shift portions 57 provided at the root parts 11b of the No. 11 electric wire are the same as those set for the radial position shift portions 57 provided at the root parts 11a. The bending direction and the amount of radial position shift set for the radial position shift portions 57 provided at the root parts 10b of the No. 10 electric wire are the same as those set for the radial position shift portions 57 provided at the root parts 10a. The bending direction and the amount of radial position shift set for the radial position shift portions 57 provided at the root parts 9b of the No. 9 electric wire are the same as those set for the radial position shift portions 57 provided at the root parts 9a. The bending direction and the amount of radial position shift set for the radial position shift portions 57 provided at the root parts 8b of the No. 8 electric wire are the same as those set for the radial position shift portions 57 provided at the root parts 8a. The bending direction and the amount of radial position shift set for the radial position shift portions 57 provided at the root parts 7b of the No. 7 electric wire are the same as those set for the radial position shift portions 57 provided at the root parts 7a. Consequently, on the first layer of the second turn of the stator coil 40, there are also formed first radial position shift portion groups 58 each of which is composed of six adjacent radial position shift portions 57 that are respectively provided at six adjacent root parts 7b-12b of the No. 7-No. 12 electric wires. In each of those first radial position shift portion groups 58, the amounts of radial position shift made by the radial position shift portions 57 decrease in the order of the root parts 7b, 8b, . . . , and 12b.

Accordingly, in the present embodiment, on the first layer of the second turn of the stator coil 40, there is satisfied the following relationship between the amounts of radial position shift made by the radial position shift portions 57 of the No. 7-No. 12 electric wires: $12a=12b<11a=11b<10a=10b<9a=9b<8a=8b<7a=7b$. Further, the sum of absolute values of the amount of radial position shift made by each of those radial position shift portions 57 which are provided at the root parts 7a and 7b and maximally bent radially outward and the amount of radial position shift made by each of those radial position shift portions 57 which are provided at the root parts 12a and 12b and maximally bent radially inward is equal to the radial thickness D of the electric wires 50A-50C. In addition, all of the first radial position shift portion groups 58 are cyclically arranged in the circumferential direction of the stator core 30 on each axial side of the stator core 30.

Furthermore, on the second layer of the second turn of the stator coil 40, there are formed only first radial position shift portion groups 58. Each of those first radial position shift portion groups 58 is composed of: either six adjacent radial position shift portions 57 that are respectively provided at six adjacent root parts 1a-6a of the No. 1-No. 6 electric wires; or six adjacent radial position shift portions 57 that are respectively provided at six adjacent root parts 1b-6b of the No. 1-No. 6 electric wires. Further, there is satisfied the following relationship between the amounts of radial position shift made by the radial position shift portions 57 of the No. 1-No. 6 electric wires: $6a=6b<5a=5b<4a=4b<3a=3b<2a=2b<1a=1b$. On each axial side of the stator core 30, the first radial position shift portion groups 58 are cyclically arranged in the circumferential direction of the stator core 30.

In addition, the configuration and arrangement of the radial position shift portions 57 of the No. 1-No. 12 electric wires in the third to sixth turns of the stator coil 40 are the same as those in the second turn; therefore, a repeated description thereof is omitted hereinafter.

As described above, in the present embodiment, the electric wires 50A-50C include the radial position shift portions 57 each of which is provided, in one of the electric wires 50A-50C, at a root part of one of the turn portions 52 of the electric wire and is radially bent to shift the radial position of the electric wire. With the radial position shift portions 57, it is possible to make both the radially inner and outer surfaces of the stator coil 40 smooth and cylindrical. Consequently, the in-slot portions 51 of the electric wires 50A-50C can be reliably received in the corresponding slots 31 of the stator core 30. As a result, the space factors of the electric wires 50A-50C in the slots 31 of the stator core 30 can be maximized, thereby ensuring high performance of the stator 20.

Moreover, in the present embodiment, all of the radial position shift portions 57 of the electric wires 50A-50C are divided into first and second types. Each of the first-type radial position shift portions 57 is bent radially outward to shift the radial direction of the electric wire outward, whereas each of the second-type radial position shift portions 57 is bent radially inward to shift the radial position of the electric wire inward.

With the first-type radial position shift portions 57, the turn portions 52 where the first-type radial position shift portions 57 are provided can be reliably prevented from interfering with the rotor of the electric rotating machine which is to be disposed radially inside of the stator 20.

On the other hand, with the second-type radial position shift portions 57, the turn portions 52 where the second-type radial position shift portions 57 are provided can be reliably prevented from protruding radially outward, thereby suppressing an increase in the outer diameter of the stator coil 40.

Moreover, by properly arranging the radial position shift portions 57 of the first and second types and suitably setting the amounts of radial position shift made by them, it is possible to easily and reliably control both the shape and radial size of the coil ends of the stator coil 40.

Furthermore, by suitably setting the ratio between the maximum amount of radially-outward position shift made by the first-type radial position shift portions 57 and the maximum amount of radially-inward position shift made by the second-type radial position shift portions 57, it is possible to reduce the maximum amount of bend of the radial position shift portions 57. Consequently, during the bending process for forming the radial position shift portions 57, it is possible to prevent the insulating coats 68 of the electric wires 50A-50C from being damaged by an excessive bending force applied thereto.

While the above particular embodiments of the invention have been shown and described, it will be understood by those skilled in the art that various modifications, changes, and improvements may be made without departing from the spirit of the invention.

What is claimed is:

1. A stator for an electric rotating machine, the stator comprising:

a hollow cylindrical stator core having a plurality of slots that are formed in a radially inner surface of the stator core and spaced at predetermined intervals in a circumferential direction of the stator core; and a stator coil made up of a plurality of wave-shaped electric wires mounted on the stator core, each of the electric wires having a plurality of in-slot portions, each of which is received in one of the slots of the stator core, and a plurality of turn portions each of which is located outside of the slots of the stator core to connect one adjacent pair of the in-slot portions of the electric wire, each of the turn portions including an apex part that is located axially furthest in the turn portion from the stator core, wherein the stator coil includes a plurality of radial position shift portions each of which is provided, in one of the electric wires, in one of the turn portions of the electric wire between the apex part of the turn portion and one of the in-slot portions of the electric wire adjoining the turn portion and is radially bent to shift the radial position of the electric wire, the plurality of radial position shift portions are divided into a plurality of types, the amounts of radial position shift made by the radial position shift portions of the same type are equal to each other, and the amounts of radial position shift made by the radial position shift portions of different types are different from each other.

2. The stator as set forth in claim 1, wherein the amounts of radial position shift made by the plurality of types of the radial position shift portions vary in the circumferential direction of the stator core.

3. The stator as set forth in claim 2, wherein the plurality of types of the radial position shift portions form a plurality of first radial position shift portion groups in each of which the amounts of radial position shift made by the radial position shift portions vary in the circumferential direction of the stator core, and the plurality of first radial position shift portion groups are cyclically arranged in the circumferential direction of the stator core.

4. The stator as set forth in claim 3, wherein the electric rotating machine is m-phase, p-pole AC machine, where m is an integer greater than zero and p is a positive even number, the number of the slots formed in the stator core is equal to m×p×n, where n is an integer greater than zero, each pair of the in-slot portions connected by one of the turn portions of the electric wires are respectively received in a pair of the slots of the stator core which are spaced m×n slots apart in the circumferential direction of the stator core, and the plurality of first radial position shift portion groups are arranged in the circumferential direction of the stator core in a cycle of m×n slots.

5. The stator as set forth in claim 3, wherein the plurality of types of the radial position shift portions further form a plurality of second radial position shift portion groups in each of which the amounts of radial position shift made by the radial position shift portions are set to a constant value, the stator coil is formed by stacking the plurality of electric wires to form a flat band-shaped electric wire assembly and rolling the electric wire assembly by a predetermined number of turns into a hollow cylindrical shape, and in at least one of the radially innermost and radially outermost turns of the stator coil, the first radial position shift portion groups are alternately arranged with the second radial position shift portion groups in the circumferential direction of the stator core.

6. A stator for an electric rotating machine, the stator comprising:

a hollow cylindrical stator core having a plurality of slots that are formed in a radially inner surface of the stator core and spaced at predetermined intervals in a circumferential direction of the stator core; and a stator coil made up of a plurality of wave-shaped electric wires mounted on the stator core, each of the electric wires having a plurality of in-slot portions, each of which is received in one of the slots of the stator core, and a plurality of turn portions each of which is located outside of the slots of the stator core to connect one adjacent pair of the in-slot portions of the electric wire, each of the turn portions including an apex part that is located axially furthest in the turn portion from the stator core, wherein the stator coil includes a plurality of radial position shift portions each of which is provided, in one of the electric wires, in one of the turn portions of the electric wire between the apex part of the turn portion and one of the in-slot portions of the electric wire adjoining the turn portion and is radially bent to shift the radial position of the electric wire, and at least one of the electric wires has no radial position shift portion formed therein.

7. A stator for an electric rotating machine, the stator comprising:

a hollow cylindrical stator core having a plurality of slots that are formed in a radially inner surface of the stator core and spaced at predetermined intervals in a circumferential direction of the stator core; and a stator coil made up of a plurality of wave-shaped electric wires mounted on the stator core, each of the electric wires having a plurality of in-slot portions, each of which is received in one of the slots of the stator core, and a plurality of turn portions each of which is located outside of the slots of the stator core to connect one adjacent pair of the in-slot portions of the electric wire, each of the turn portions including an apex part that is located axially furthest in the turn portion from the stator core, wherein the stator coil includes a plurality of radial position shift portions each of which is provided, in one of the electric wires, in one of the turn portions of the electric wire between the apex part of the turn portion and one of the in-slot portions of the electric wire adjoining the turn portion and is radially bent to shift the radial position of the electric wire, and each of the turn portions of the electric wires is stepped to include a plurality of shoulder parts that extend parallel to an axial end face of the stator core from which the turn portion protrudes.

8. A stator for an electric rotating machine, the stator comprising:

a hollow cylindrical stator core having a plurality of slots that are formed in a radially inner surface of the stator core and spaced at predetermined intervals in a circumferential direction of the stator core; and a stator coil made up of a plurality of wave-shaped electric wires mounted on the stator core, each of the electric wires having a plurality of in-slot portions, each of which is received in one of the slots of the stator core, and a plurality of turn portions each of which is located outside of the slots of the stator core to connect one adjacent pair of the in-slot portions of the electric wire, each of the turn portions including an apex part that is located axially furthest in the turn portion from the stator core, wherein the stator coil includes a plurality of radial position shift portions each of which is provided, in one of the electric wires, in one of the turn portions of the electric wire between the apex part of the turn portion and one of the in-slot portions of the electric wire adjoining the turn portion and is radially bent to shift the radial position of the electric wire, all the axial distances between the bend start positions of the plurality of radial position shift portions and corresponding axial end faces of the stator core are equal, each of the plurality of radial position shift portions is substantially crank-shaped to include a straight part at the center thereof and a pair of first and second bent parts respectively on opposite sides of the straight part, and a thickness of the straight part on a reference plane, which is defined to extend perpendicular to the circumferential direction of the stator core, is set to be less than a radial thickness of other portions of the electric wire.

9. A stator for an electric rotating machine, the stator comprising:
a hollow cylindrical stator core having a plurality of slots that are formed in a radially inner surface of the stator core and spaced at predetermined intervals in a circumferential direction of the stator core; and
a stator coil made up of a plurality of wave-shaped electric wires mounted on the stator core, each of the electric wires having a plurality of in-slot portions, each of which is received in one of the slots of the stator core, and a plurality of turn portions each of which is located outside of the slots of the stator core to connect one adjacent pair of the in-slot portions of the electric wire, each of the turn portions including an apex part that is located axially furthest in the turn portion from the stator core,
wherein
the stator coil includes a plurality of radial position shift portions each of which is provided, in one of the electric wires, in one of the turn portions of the electric wire between the apex part of the turn portion and one of the in-slot portions of the electric wire adjoining the turn portion and is radially bent to shift the radial position of the electric wire,
all the axial distances between the bend start positions of the plurality of radial position shift portions and corresponding axial end faces of the stator core are equal,
each of the plurality of radial position shift portions is substantially crank-shaped to include a straight part at the center thereof and a pair of first and second bent parts respectively on opposite sides of the straight part, and a cross-sectional area of the straight part perpendicular to an extending direction of the electric wire is set to be less than that of other portions of the electric wire perpendicular to the same.

10. A stator for an electric rotating machine, the stator comprising:
a hollow cylindrical stator core having a plurality of slots that are formed in a radially inner surface of the stator core and spaced at predetermined intervals in a circumferential direction of the stator core; and
a stator coil made up of a plurality of wave-shaped electric wires mounted on the stator core, each of the electric wires having a plurality of in-slot portions, each of which is received in one of the slots of the stator core, and a plurality of turn portions each of which is located outside of the slots of the stator core to connect one adjacent pair of the in-slot portions of the electric wire, each of the turn portions including an apex part that is located axially furthest in the turn portion from the stator core,
wherein
the stator coil includes a plurality of radial position shift portions each of which is provided, in one of the electric wires, in one of the turn portions of the electric wire between the apex part of the turn portion and one of the in-slot portions of the electric wire adjoining the turn portion and is radially bent to shift the radial position of the electric wire,
each of the electric wires is made up of an electric conductor having a rectangular cross section and an insulating coat covering the surface of the electric conductor, and
the insulating coat is two-layer structured to include an inner layer and an outer layer.

* * * * *